US010198893B2

(12) United States Patent
Chun

(10) Patent No.: US 10,198,893 B2
(45) Date of Patent: Feb. 5, 2019

(54) METHODS AND SYSTEMS FOR PLAYING BACCARAT JACKPOT

(75) Inventor: Jay Chun, Hong Kong (CN)

(73) Assignee: IGT, Las Vegas, NV (US)

( * ) Notice: Subject to any disclaimer, the term of this patent is extended or adjusted under 35 U.S.C. 154(b) by 198 days.

(21) Appl. No.: 13/483,803

(22) Filed: May 30, 2012

(65) Prior Publication Data

US 2012/0270625 A1 Oct. 25, 2012

Related U.S. Application Data

(60) Division of application No. 11/874,158, filed on Oct. 17, 2007, now Pat. No. 8,210,920, which is a continuation-in-part of application No. 11/042,732, filed on Jan. 24, 2005, and a continuation-in-part of application No. 11/198,218, filed on Aug. 5, 2005.

(51) Int. Cl.
*A63F 13/00* (2014.01)
*G07F 17/32* (2006.01)

(52) U.S. Cl.
CPC .................................... *G07F 17/32* (2013.01)

(58) Field of Classification Search
CPC ........... G07F 17/3244; G07F 17/32858; G07F 17/326; G07F 17/3262; G07F 17/3272; G07F 17/3293
USPC ...................................................... 463/12, 13
See application file for complete search history.

(56) References Cited

U.S. PATENT DOCUMENTS 3,708,219 A 1/1973 Forlini et al.
3,810,627 A 5/1974 Levy
3,909,002 A 9/1975 Levy
3,998,309 A 12/1976 Mandas et al.
4,095,795 A 6/1978 Saxton
4,333,715 A 6/1982 Brooks
4,337,945 A 7/1982 Levy
4,339,798 A 7/1982 Hedges
4,448,419 A 5/1984 Telnaes
4,467,424 A 8/1984 Hedges
4,517,558 A 5/1985 Davids
4,607,844 A 8/1986 Fullerton
(Continued)

FOREIGN PATENT DOCUMENTS

CA 2377577 6/2000
EP 0478412 4/1992
(Continued)

OTHER PUBLICATIONS

International Search Report for PCT/CA2006/002069 dated Mar. 20, 2007, 16 pages.
(Continued)

*Primary Examiner* — Tramar Harper
*Assistant Examiner* — Jeffrey Wong
(74) *Attorney, Agent, or Firm* — Neal, Gerber & Eisenberg LLP

(57) ABSTRACT

A method and system for playing jackpot and live baccarat games are provided. One feature of the jackpot method involves the use of card combinations that may include, e.g., at least one zero-point card. Another feature of the jackpot method involves initial jackpot contribution from the banker who operates the baccarat game. It is also provided a software program or a set of software program for carrying out any or all the steps of the disclosed gaming method.

18 Claims, 13 Drawing Sheets

(56) References Cited

U.S. PATENT DOCUMENTS

| | | | | |
|---|---|---|---|---|
| 4,621,814 | A | | 11/1986 | Stepan et al. |
| 4,659,082 | A | | 4/1987 | Greenberg |
| 4,659,182 | A | | 4/1987 | Aizawa |
| 4,662,635 | A | | 5/1987 | Enokian |
| 4,718,672 | A | | 1/1988 | Okada |
| 4,856,787 | A | | 8/1989 | Itkis |
| 4,858,932 | A | | 8/1989 | Keane |
| 4,861,041 | A | | 8/1989 | Jones |
| 4,911,449 | A | | 3/1990 | Dickinson et al. |
| 4,912,548 | A | | 3/1990 | Shanker et al. |
| 4,926,327 | A | | 5/1990 | Sidley |
| 5,033,744 | A | | 7/1991 | Bridgeman |
| 5,042,818 | A | | 8/1991 | Weingardt |
| 5,048,833 | A | | 9/1991 | Lamie |
| 5,086,354 | A | | 2/1992 | Bass et al. |
| 5,113,272 | A | | 5/1992 | Reamey |
| 5,132,839 | A | | 7/1992 | Travis |
| 5,248,142 | A | | 9/1993 | Breeding |
| 5,288,081 | A | | 2/1994 | Breeding |
| 5,319,491 | A | | 6/1994 | Selbrede |
| 5,325,830 | A | | 7/1994 | Hammer |
| 5,342,047 | A | | 8/1994 | Heidel et al. |
| 5,362,064 | A | * | 11/1994 | Lofink ................ A63F 3/00157 273/274 |
| 5,364,100 | A | | 11/1994 | Ludlow et al. |
| 5,376,587 | A | | 12/1994 | Buchmann et al. |
| 5,393,061 | A | | 2/1995 | Manship et al. |
| 5,393,067 | A | | 2/1995 | Paulsen |
| 5,395,119 | A | * | 3/1995 | Jacob ................. A63F 3/00157 273/274 |
| 5,395,120 | A | | 3/1995 | Malek |
| 5,456,465 | A | | 10/1995 | Durham |
| 5,467,893 | A | | 11/1995 | Landis et al. |
| 5,472,194 | A | | 12/1995 | Breeding et al. |
| 5,476,259 | A | | 12/1995 | Weingardt |
| 5,490,670 | A | | 2/1996 | Hobert |
| 5,494,296 | A | | 2/1996 | Grassa |
| 5,539,547 | A | | 7/1996 | Ishii et al. |
| 5,544,892 | A | | 8/1996 | Breeding |
| 5,580,055 | A | | 12/1996 | Hagiwara |
| 5,580,310 | A | | 12/1996 | Orus et al. |
| 5,585,821 | A | | 12/1996 | Ishikura et al. |
| 5,586,937 | A | | 12/1996 | Menashe |
| 5,588,650 | A | | 12/1996 | Eman et al. |
| 5,589,980 | A | | 12/1996 | Bass et al. |
| 5,605,334 | A | | 2/1997 | McCrea |
| 5,611,730 | A | | 3/1997 | Weiss |
| 5,613,909 | A | | 3/1997 | Stelovsky |
| 5,618,232 | A | | 4/1997 | Martin |
| 5,639,092 | A | | 6/1997 | Macaisa |
| 5,643,086 | A | | 7/1997 | Alcorn et al. |
| 5,655,961 | A | | 8/1997 | Acres et al. |
| 5,669,606 | A | | 9/1997 | Brown |
| 5,673,917 | A | | 10/1997 | Vancura |
| 5,722,890 | A | | 3/1998 | Libby et al. |
| 5,707,287 | A | | 4/1998 | McCrea |
| 5,735,525 | A | | 4/1998 | McCrea |
| 5,743,523 | A | | 4/1998 | Kelly et al. |
| 5,743,798 | A | | 4/1998 | Adams et al. |
| 5,745,197 | A | | 4/1998 | Leung et al. |
| 5,752,881 | A | | 5/1998 | Inoue |
| 5,752,882 | A | | 5/1998 | Acres et al. |
| 5,759,103 | A | | 6/1998 | Freels et al. |
| 5,762,552 | A | | 6/1998 | Vuong |
| 5,764,317 | A | | 6/1998 | Sadovnik et al. |
| 5,766,076 | A | | 6/1998 | Pease et al. |
| 5,770,533 | A | | 6/1998 | Franchi |
| 5,772,509 | A | | 6/1998 | Weiss |
| RE35,864 | E | | 7/1998 | Weingardt |
| 5,779,546 | A | | 7/1998 | Meissner |
| 5,782,692 | A | | 7/1998 | Stelovsky |
| 5,788,574 | A | | 8/1998 | Ornstein |
| 5,791,992 | A | | 8/1998 | Crump et al. |
| 5,795,225 | A | | 8/1998 | Jones |
| 5,797,795 | A | | 8/1998 | Takemoto et al. |
| 5,800,268 | A | | 9/1998 | Molnick |
| 5,803,451 | A | | 9/1998 | Kelly et al. |
| 5,806,854 | A | | 9/1998 | Coleman |
| 5,820,459 | A | | 10/1998 | Acres et al. |
| 5,820,461 | A | | 10/1998 | Pernatozzi |
| 5,830,067 | A | | 11/1998 | Graves |
| 5,836,817 | A | | 11/1998 | Acres et al. |
| 5,836,818 | A | | 11/1998 | Jones |
| 5,839,730 | A | | 11/1998 | Pike |
| 5,839,731 | A | | 11/1998 | Feola |
| 5,842,698 | A | | 12/1998 | Brown |
| 5,851,149 | A | | 12/1998 | Xidos et al. |
| 5,873,781 | A | | 2/1999 | Keane |
| 5,876,283 | A | * | 3/1999 | Parra .................. A63F 3/00157 273/292 |
| 5,885,085 | A | | 3/1999 | Fujita |
| 5,888,136 | A | | 3/1999 | Herbert |
| 5,909,876 | A | | 6/1999 | Brown |
| 5,910,046 | A | | 6/1999 | Wada et al. |
| 5,911,626 | A | | 6/1999 | McCrea |
| 5,921,865 | A | | 6/1999 | Scagnelli |
| 5,931,471 | A | | 8/1999 | Bonito |
| 5,951,397 | A | | 9/1999 | Dickinson |
| 5,956,180 | A | | 9/1999 | Bass et al. |
| 5,957,459 | A | | 9/1999 | Chae |
| 5,961,119 | A | | 10/1999 | Brown |
| 5,967,893 | A | | 10/1999 | Lawrence et al. |
| 6,001,016 | A | | 12/1999 | Walker |
| 6,015,346 | A | | 1/2000 | Bennett |
| 6,019,374 | A | | 2/2000 | Breeding |
| 6,027,115 | A | | 2/2000 | Griswold et al. |
| 6,039,650 | A | | 3/2000 | Hill |
| 6,050,895 | A | | 4/2000 | Luciano et al. |
| 6,054,969 | A | | 4/2000 | Haisma |
| 6,056,641 | A | | 5/2000 | Webb |
| 6,059,658 | A | | 5/2000 | Mangano et al. |
| 6,080,063 | A | | 6/2000 | Khosla |
| 6,083,105 | A | | 7/2000 | Ronin et al. |
| 6,093,103 | A | | 7/2000 | McCrea |
| 6,113,493 | A | | 9/2000 | Walker et al. |
| 6,117,012 | A | | 9/2000 | McCrea |
| 6,135,884 | A | | 10/2000 | Hedrick et al. |
| 6,142,876 | A | | 11/2000 | Cumbers |
| 6,146,270 | A | | 11/2000 | Huard |
| 6,149,522 | A | | 11/2000 | Alcorn et al. |
| 6,159,095 | A | | 12/2000 | Frohm et al. |
| 6,159,098 | A | | 12/2000 | Slomiany et al. |
| 6,165,069 | A | | 12/2000 | Sines et al. |
| 6,213,875 | B1 | | 4/2001 | Suzuki |
| 6,217,447 | B1 | | 4/2001 | Lofink |
| 6,244,596 | B1 | | 6/2001 | Kondratjuk |
| 6,251,014 | B1 | | 6/2001 | Stockdale et al. |
| 6,252,707 | B1 | | 6/2001 | Kleinberger et al. |
| 6,254,481 | B1 | | 7/2001 | Jaffe |
| 6,254,484 | B1 | | 7/2001 | McCrea, Jr. |
| 6,264,561 | B1 | | 7/2001 | Saffari |
| 6,279,910 | B1 | | 8/2001 | deKeller |
| 6,293,864 | B1 | | 9/2001 | Romero |
| 6,312,334 | B1 | | 11/2001 | Yoseloff |
| 6,315,666 | B1 | | 11/2001 | Mastera et al. |
| 6,336,857 | B1 | | 1/2002 | McBride |
| 6,337,513 | B1 | | 1/2002 | Clevenger et al. |
| 6,345,824 | B1 | | 2/2002 | Selitzky |
| 6,346,044 | B1 | | 2/2002 | Mccrea |
| 6,347,996 | B1 | | 2/2002 | Gilmore et al. |
| 6,361,437 | B1 | | 3/2002 | Walker |
| 6,368,216 | B1 | | 4/2002 | Hedrick et al. |
| 6,379,244 | B1 | | 4/2002 | Sagawa et al. |
| 6,394,907 | B1 | | 5/2002 | Rowe |
| 6,398,220 | B1 | | 6/2002 | Inoue |
| 6,409,602 | B1 | | 6/2002 | Wiltshire |
| 6,416,827 | B1 | | 7/2002 | Chakrapani et al. |
| 6,435,970 | B1 | | 8/2002 | Baerlocher et al. |
| 6,444,496 | B1 | | 9/2002 | Edwards et al. |
| 6,445,185 | B1 | | 9/2002 | Damadian et al. |
| 6,460,848 | B1 | | 10/2002 | Soltys |
| 6,491,583 | B1 | | 12/2002 | Gauselmann |
| 6,503,147 | B1 | | 1/2003 | Stockdale et al. |
| 6,508,709 | B1 | | 1/2003 | Karmarkar |

(56) References Cited

U.S. PATENT DOCUMENTS 6,511,072 B1 1/2003 Santa Cruz
6,511,375 B1 1/2003 Kaminkow
6,512,559 B1 1/2003 Hashimoto et al.
6,514,141 B1 2/2003 Kaminkow et al.
6,517,073 B1 2/2003 Vancura
6,517,433 B2 2/2003 Loose et al.
6,517,436 B2 2/2003 Soltys
6,517,437 B1 2/2003 Wells et al.
6,540,230 B1 4/2003 Walker
6,547,664 B2 4/2003 Saunders
6,569,018 B2 5/2003 Jaffe
6,575,541 B1 6/2003 Hedrick et al.
6,575,834 B1 6/2003 Lindo
6,582,301 B2 6/2003 Hill
6,585,591 B1 7/2003 Baerlocher et al.
6,588,758 B1 7/2003 Lee
6,607,195 B2 8/2003 Vancura
6,628,244 B1 9/2003 Hirosawa
D480,961 S 10/2003 Deadman
6,646,695 B1 11/2003 Gauselmann
6,652,378 B2 11/2003 Cannon et al.
6,659,864 B2 12/2003 McGahn et al.
6,661,425 B1 12/2003 Hiroaki
6,676,517 B2 1/2004 Beavers
6,685,567 B2 2/2004 Cockerille et al.
6,695,703 B1 2/2004 McGahn
6,702,675 B2 3/2004 Poole et al.
6,712,694 B1 3/2004 Nordman
6,712,696 B2 3/2004 Soltys
6,715,756 B2 4/2004 Inoue
6,717,728 B2 4/2004 Putilin
6,719,291 B1 4/2004 deKeller
6,722,979 B2 4/2004 Gilmore et al.
6,726,564 B2 4/2004 Hogan
6,726,565 B2 4/2004 Hughs-Baird
6,789,801 B2 9/2004 Snow
6,800,026 B2 10/2004 Cannon
6,802,777 B2 10/2004 Seelig et al.
6,804,763 B1 10/2004 Stockdale et al.
6,817,945 B2 11/2004 Seelig et al.
6,817,946 B2 11/2004 Motegi et al.
6,863,608 B1 3/2005 LeMay et al.
6,866,586 B2 3/2005 Oberberger et al.
6,887,157 B2 5/2005 LeMay et al.
6,890,259 B2 5/2005 Breckner et al.
6,906,762 B1 6/2005 Witehira et al.
6,937,298 B2 8/2005 Okada
7,008,319 B2 3/2006 Montgomery et al.
7,029,395 B1 4/2006 Baerlocher
7,114,724 B2 10/2006 Ritzer
7,128,647 B2 10/2006 Muir
7,189,161 B1 3/2007 Wiltshire
7,198,272 B2 4/2007 Duhamel
7,204,753 B2 4/2007 Ozaki et al.
7,220,181 B2 5/2007 Okada
7,252,288 B2 8/2007 Seelig et al.
7,255,643 B2 8/2007 Ozaki et al.
7,303,473 B2 12/2007 Rowe
7,303,475 B2 12/2007 Britt
7,309,284 B2 12/2007 Griswold et al.
7,322,884 B2 1/2008 Emori et al.
7,326,115 B2 2/2008 Baerlocher
7,329,179 B2 2/2008 Baerlocher
7,329,181 B2 2/2008 Hoshino et al.
7,351,146 B2 4/2008 Kaminkow
7,367,884 B2 5/2008 Breeding
7,387,570 B2 6/2008 Randall
7,404,765 B2 7/2008 Soltys
7,407,438 B2 8/2008 Schubert
7,419,160 B1 9/2008 D'Ambrosio
7,434,805 B2 10/2008 Grauzer
7,451,987 B1 11/2008 Feola
7,452,270 B2 11/2008 Walker et al.
7,465,227 B2 12/2008 Baerlocher
7,470,185 B2 12/2008 Baerlocher
7,488,251 B2 2/2009 Kaminkow
7,503,849 B2 3/2009 Hornik et al.
7,537,456 B2 5/2009 Snow
7,566,274 B2 7/2009 Johnson et al.
7,575,512 B2 8/2009 Kennedy
7,591,726 B2 9/2009 Baerlocher et al.
7,591,728 B2 9/2009 Gioia
7,618,319 B2 11/2009 Casey et al.
7,621,533 B2 11/2009 Kenny
7,666,086 B2 2/2010 Baerlocher
7,666,087 B2 2/2010 Hughs-Baird
7,699,698 B2 4/2010 Randall
7,731,586 B2 6/2010 Letovsky
7,735,657 B2 6/2010 Johnson
7,753,798 B2 7/2010 Soltys
7,758,419 B2 7/2010 Rowe et al.
7,762,889 B2 7/2010 Shijeta
7,769,232 B2 8/2010 Downs
7,775,524 B2 8/2010 Lutnick et al.
7,780,515 B2 8/2010 Okada
7,789,743 B2 9/2010 Walker et al.
7,819,744 B2 10/2010 Hughs-Baird
7,822,641 B2 10/2010 Abbott et al.
7,828,643 B2 11/2010 Baerlocher
7,837,547 B2 11/2010 Cannon
7,846,018 B2 12/2010 Baerlocher
7,867,077 B2 1/2011 Baerlocher et al.
7,878,892 B2 2/2011 Sines et al.
7,905,771 B2 3/2011 Walker et al.
7,905,774 B2 3/2011 Walker et al.
7,914,368 B2 3/2011 Chun
7,914,372 B2 3/2011 Tessmer et al.
7,918,723 B2 4/2011 Chun
7,922,587 B2 4/2011 Chun
7,931,531 B2 4/2011 Obetherger
7,950,993 B2 5/2011 Oberberger
7,963,845 B2 6/2011 Baerlocher
7,967,674 B2 6/2011 Baerlocher
7,976,378 B2 7/2011 Baerlocher
7,980,948 B2 7/2011 Rowe et al.
8,020,866 B2 9/2011 Walker et al.
8,066,564 B2 11/2011 Randall
8,087,999 B2 1/2012 Oberberger et al.
8,128,491 B2 3/2012 Vasquez et al.
8,128,492 B2 3/2012 Vasquez et al.
8,152,624 B2 4/2012 Gerrard et al.
8,152,629 B2 4/2012 DeWaal et al.
8,167,711 B2 5/2012 Baerlocher
8,172,660 B2 5/2012 Lancaster et al.
8,177,627 B2 5/2012 Baerlocher
8,182,323 B2 5/2012 Okada
8,197,335 B2 6/2012 DeWaal et al.
8,202,153 B2 6/2012 Baerlocher
8,206,212 B2 6/2012 Iddings et al.
8,231,456 B2 7/2012 Zielinski
8,235,801 B2 8/2012 Tan
8,267,765 B2 9/2012 Baerlocher
8,305,550 B2 11/2012 Jung et al.
8,313,373 B2 11/2012 Walker et al.
8,317,589 B2 11/2012 Tessmer et al.
8,342,954 B2 1/2013 Oberberger et al.
8,360,852 B2 1/2013 Randall
8,360,859 B2 1/2013 Walker et al.
8,425,305 B2 4/2013 Baerlocher et al.
8,430,735 B2 4/2013 Oberberger
8,430,739 B2 4/2013 Rodgers
8,454,427 B2 6/2013 Baerlocher
8,460,095 B2 6/2013 Tan
8,474,820 B2 7/2013 Walker et al.
8,485,888 B2 7/2013 Baerlocher
8,496,521 B2 7/2013 Randall
8,500,533 B2 8/2013 Lutnick et al.
8,506,380 B2 8/2013 Hughes et al.
8,517,824 B2 8/2013 Zielinski et al.
9,135,775 B2 9/2015 Pececnik
2001/0000118 A1 4/2001 Sines et al.
2001/0013681 A1 8/2001 Bruzzese et al.
2001/0029200 A1 10/2001 Romero
2002/0002070 A1 1/2002 Romero

(56) References Cited

U.S. PATENT DOCUMENTS

2002/0002073 A1 1/2002 Montgomery
2002/0015489 A1 2/2002 Ben-David
2002/0045472 A1 4/2002 Adams
2002/0068635 A1 6/2002 Hill
2002/0072407 A1 6/2002 Soltys
2002/0077712 A1 6/2002 Safaei et al.
2002/0147042 A1 6/2002 Hill
2002/0094869 A1 7/2002 Harkham
2002/0111205 A1 8/2002 Beavers
2002/0115489 A1 8/2002 Jordan
2002/0147047 A1 10/2002 Letovsky
2002/0173354 A1 11/2002 Winans et al.
2003/0003997 A1 1/2003 Vuong
2003/0013510 A1 1/2003 Vuong
2003/0027624 A1 2/2003 Gilmore et al.
2003/0032478 A1 2/2003 Takahama et al.
2003/0032479 A1 2/2003 LeMay et al.
2003/0050107 A1 3/2003 Moody
2003/0060271 A1 3/2003 Gilmore et al.
2003/0064781 A1 4/2003 Muir
2003/0069071 A1 4/2003 Britt
2003/0073497 A1 4/2003 Nelson
2003/0087690 A1 5/2003 Loose et al.
2003/0104854 A1 6/2003 Cannon
2003/0130028 A1 7/2003 Aida et al.
2003/0151199 A1 8/2003 Lee
2003/0151201 A1* 8/2003 Lee .................... A63F 3/00157 273/292
2003/0176214 A1 9/2003 Burak et al.
2003/0195043 A1* 10/2003 Shinners ................ G07F 17/32 463/42
2003/0203756 A1 10/2003 Jackson
2003/0224854 A1 12/2003 Joao
2003/0232651 A1 12/2003 Huard
2003/0234489 A1 12/2003 Okada
2003/0236114 A1 12/2003 Griswold et al.
2003/0236118 A1 12/2003 Okada
2004/0002379 A1 1/2004 Parrott et al.
2004/0023712 A1 2/2004 Oliver
2004/0023714 A1 2/2004 Asdale
2004/0023722 A1 2/2004 Vuong
2004/0029636 A1 2/2004 Wells
2004/0063490 A1 4/2004 Okada
2004/0066475 A1 4/2004 Searle
2004/0070146 A1 4/2004 Snow
2004/0084843 A1 5/2004 Snow
2004/0087357 A1 5/2004 Johnson
2004/0090003 A1 5/2004 Snow
2004/0090005 A1 5/2004 Snow
2004/0108656 A1 6/2004 Snow
2004/0116178 A1 6/2004 Okada
2004/0116179 A1 6/2004 Nicely
2004/0145116 A1 7/2004 Calvo et al.
2004/0147303 A1 7/2004 Imura et al.
2004/0147314 A1 7/2004 LeMay et al.
2004/0150162 A1 8/2004 Okada
2004/0162146 A1 8/2004 Ooto
2004/0166925 A1 8/2004 Emori et al.
2004/0171423 A1 9/2004 Silva et al.
2004/0183972 A1 9/2004 Bell
2004/0192430 A1 9/2004 Burak et al.
2004/0198485 A1 10/2004 Loose et al.
2004/0207154 A1 10/2004 Okada
2004/0209666 A1 10/2004 Tashiro
2004/0209667 A1 10/2004 Emori et al.
2004/0209668 A1 10/2004 Okada
2004/0209671 A1 10/2004 Okada
2004/0209678 A1 10/2004 Okada
2004/0209683 A1 10/2004 Okada
2004/0214635 A1 10/2004 Okada
2004/0214637 A1 10/2004 Nonaka
2004/0224747 A1 11/2004 Okada
2004/0224777 A1 11/2004 Smith
2004/0233663 A1 11/2004 Emslie et al.
2004/0235542 A1 11/2004 Stronach
2004/0239582 A1 12/2004 Seymour
2005/0003886 A1 1/2005 Englman et al.
2005/0032571 A1 2/2005 Asonuma
2005/0037843 A1 2/2005 Wells et al.
2005/0049032 A1 3/2005 Kobayashi
2005/0049046 A1 3/2005 Kobayashi
2005/0062227 A1 3/2005 Grauzer
2005/0062410 A1 3/2005 Bell et al.
2005/0063055 A1 3/2005 Engel
2005/0073102 A1* 4/2005 Yoseloff .................. G07F 17/32 273/292
2005/0079913 A1 4/2005 Inamura
2005/0085292 A1 4/2005 Inamura
2005/0153772 A1 7/2005 Griswold et al.
2005/0153775 A1 7/2005 Griswold et al.
2005/0176493 A1 8/2005 Nozaki et al.
2005/0176507 A1 8/2005 Ephrati et al.
2005/0192090 A1 9/2005 Muir et al.
2005/0192099 A1 9/2005 Nguyen et al.
2005/0206582 A1 9/2005 Bell et al.
2005/0208994 A1 9/2005 Berman
2005/0218597 A1 10/2005 Parsadaian
2005/0233794 A1 10/2005 Cannon
2005/0233799 A1 10/2005 LeMay et al.
2005/0233803 A1 10/2005 Yang
2005/0239539 A1 10/2005 Inamura
2005/0266912 A1 12/2005 Sekiguchi
2005/0282625 A1 12/2005 Nicely
2005/0285337 A1 12/2005 Durham et al.
2006/0030399 A1 2/2006 Baerlocher
2006/0040733 A1 2/2006 Baerlocher
2006/0052168 A1 3/2006 Shacham
2006/0063577 A1 3/2006 Downs
2006/0071429 A1 4/2006 Okujyo
2006/0073882 A1 4/2006 Rozkin et al.
2006/0092170 A1 5/2006 Bathiche et al.
2006/0100014 A1 5/2006 Griswold et al.
2006/0103071 A1 5/2006 Ritzer
2006/0103951 A1 5/2006 Bell et al.
2006/0125745 A1 6/2006 Evanicky
2006/0128472 A1 6/2006 Beavers
2006/0135240 A1 6/2006 Barshack
2006/0148547 A1 7/2006 Montgomery
2006/0166726 A1 7/2006 Chun
2006/0166727 A1 7/2006 Burak
2006/0178181 A1 8/2006 Chun
2006/0189382 A1 8/2006 Muir et al.
2006/0191177 A1 8/2006 Engel
2006/0226605 A1 10/2006 Kenny
2006/0258446 A1 11/2006 Nguyen et al.
2006/0284574 A1 12/2006 Emslie et al.
2006/0287042 A1 12/2006 Osawa
2006/0287058 A1 12/2006 Resnick
2006/0290594 A1 12/2006 Engel et al.
2007/0004510 A1 1/2007 Underdahl et al.
2007/0010315 A1 1/2007 Hein
2007/0021198 A1 1/2007 Muir et al.
2007/0026922 A1 2/2007 Lindo
2007/0026947 A1 2/2007 Chun
2007/0032283 A1* 2/2007 Chun ...................... G07F 17/32 463/12
2007/0060259 A1 3/2007 Pececnik
2007/0129123 A1 6/2007 Eryou et al.
2007/0135204 A1 6/2007 Nicely
2007/0155512 A1 7/2007 Wells
2007/0218968 A1 9/2007 Snow
2007/0243927 A1 10/2007 Soltys
2007/0243929 A1 10/2007 Skotarczak
2007/0243935 A1 10/2007 Huizinga
2008/0009334 A1 1/2008 Walker
2008/0020816 A1 1/2008 Griswold et al.
2008/0020839 A1 1/2008 Wells et al.
2008/0020840 A1 1/2008 Wells et al.
2008/0020841 A1 1/2008 Wells et al.
2008/0026807 A1 1/2008 Moshal
2008/0064467 A1 3/2008 Reiner
2008/0076499 A1 3/2008 Lowery
2008/0085769 A1 4/2008 Lutnick
2008/0108400 A1 5/2008 Chun

(56) References Cited

U.S. PATENT DOCUMENTS

| | | | |
|---|---|---|---|
| 2008/0113778 | A1 | 5/2008 | Chun |
| 2008/0113783 | A1 | 5/2008 | Czyzewski |
| 2008/0146311 | A1 | 6/2008 | Walker |
| 2008/0146344 | A1 | 6/2008 | Rowe et al. |
| 2008/0149705 | A1 | 6/2008 | Giobbi et al. |
| 2008/0182650 | A1 | 7/2008 | Randall et al. |
| 2008/0194334 | A1 | 8/2008 | Kuok |
| 2008/0230993 | A1 | 9/2008 | Chun |
| 2008/0231611 | A1 | 9/2008 | Bathiche et al. |
| 2008/0248865 | A1 | 10/2008 | Tedesco et al. |
| 2008/0254881 | A1 | 10/2008 | Lutnick |
| 2008/0280667 | A1 | 11/2008 | Chun |
| 2008/0280668 | A1 | 11/2008 | Chun |
| 2008/0305855 | A1 | 12/2008 | Czyewski |
| 2008/0318668 | A1 | 12/2008 | Ching et al. |
| 2009/0029755 | A1 | 1/2009 | Chun |
| 2009/0029766 | A1 | 1/2009 | Lutnick et al. |
| 2009/0061974 | A1 | 3/2009 | Lutnick |
| 2009/0069079 | A1 | 3/2009 | Britt |
| 2009/0111573 | A1 | 4/2009 | Iddings |
| 2009/0115133 | A1 | 5/2009 | Kelly |
| 2009/0176547 | A1 | 7/2009 | Katz |
| 2009/0221360 | A1 | 9/2009 | Wooding |
| 2010/0102511 | A1 | 4/2010 | Tammesoo |
| 2010/0105457 | A1 | 4/2010 | Miller |
| 2010/0105459 | A1 | 4/2010 | Miller |
| 2010/0111820 | A1 | 5/2010 | Natura et al. |
| 2010/0113119 | A1 | 5/2010 | Miller |
| 2010/0117299 | A1 | 5/2010 | Nicely |
| 2010/0120506 | A1 | 5/2010 | Davis et al. |
| 2010/0130280 | A1 | 5/2010 | Arezina et al. |
| 2010/0222133 | A1 | 9/2010 | Spencer |
| 2010/0234086 | A1 | 9/2010 | Michaelson |
| 2010/0255897 | A1 | 10/2010 | Pececnik |
| 2010/0295247 | A1 | 11/2010 | Laduca |
| 2011/0031694 | A1 | 2/2011 | Cohen |
| 2011/0039612 | A1 | 2/2011 | Pececnik |
| 2011/0105207 | A1 | 5/2011 | Chun |
| 2011/0111824 | A1 | 5/2011 | Cuddy et al. |
| 2011/0140362 | A1 | 6/2011 | Chun |
| 2011/0159965 | A1 | 6/2011 | Chun |

FOREIGN PATENT DOCUMENTS

| | | | |
|---|---|---|---|
| EP | 1101513 | 5/2001 | |
| EP | 1467329 | 10/2004 | |
| EP | 1892683 | 2/2008 | |
| GB | 2408696 | 6/2005 | |
| GB | 2403429 | 7/2006 | |
| GB | 2430385 | 3/2007 | |
| WO | WO 99/19027 | 4/1999 | |
| WO | WO 99/42889 | 8/1999 | |
| WO | WO 99/44095 | 9/1999 | |
| WO | 0079467 | 12/2000 | |
| WO | WO 01/09664 | 2/2001 | |
| WO | WO 01/15127 | 3/2001 | |
| WO | WO 01/15128 | 3/2001 | |
| WO | WO 01/15132 | 3/2001 | |
| WO | 0217841 | 3/2002 | |
| WO | WO 02081040 A1 * | 10/2002 | ......... A63F 3/00157 |
| WO | WO 2004/001486 | 12/2003 | |
| WO | WO 2004/102520 | 11/2004 | |
| WO | 2005056134 | 6/2005 | |
| WO | WO 2006/034192 | 3/2006 | |
| WO | WO 2006/038819 | 4/2006 | |
| WO | 2007016035 | 2/2007 | |
| WO | WO 2007/032945 | 3/2007 | |
| WO | WO 2007/073534 | 6/2007 | |
| WO | 2007099334 | 3/2008 | |
| WO | 2008026950 | 3/2008 | |
| WO | 2008092385 | 8/2008 | |
| WO | 2009107131 | 9/2009 | |

OTHER PUBLICATIONS

International Search Report for PCT/CA2006/001295, dated Nov. 20, 2006, 17 pages.

EZ Baccarat, DP Stud, Inc., www.ezbaccarat.com, 2 pages, (2003).

* cited by examiner

FIG. 4A
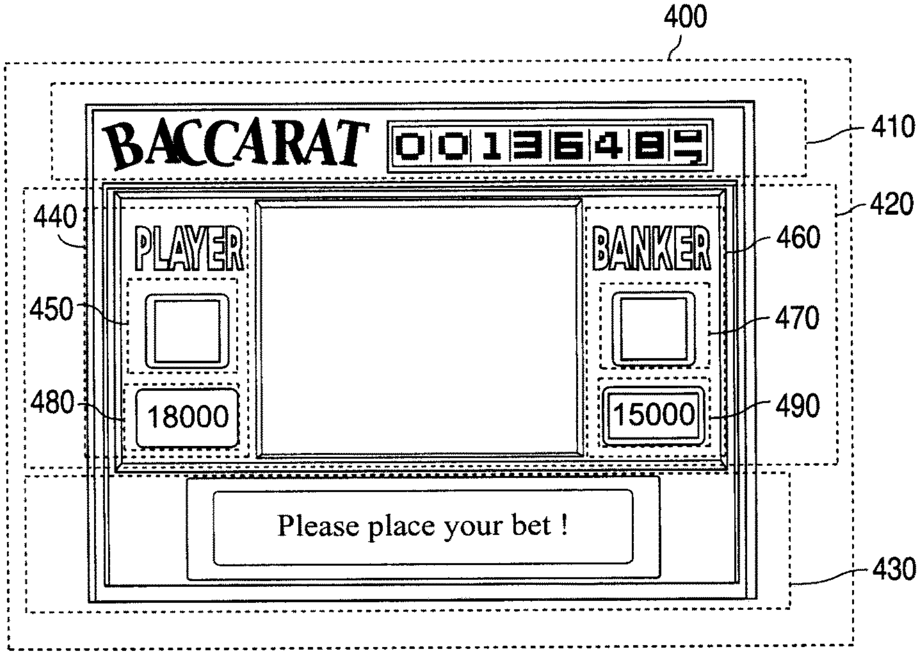
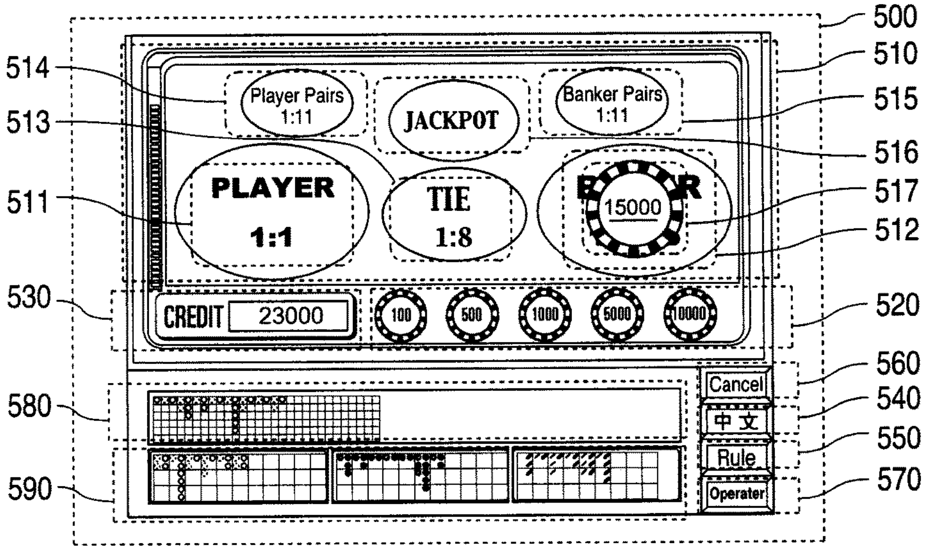
FIG. 4B

METHODS AND SYSTEMS FOR PLAYING BACCARAT JACKPOT

CROSS REFERENCE TO RELATED APPLICATIONS

This application is a divisional of U.S. application Ser. No. 11/874,158 filed Oct. 17, 2007 which is a continuation-in-part application of U.S. application Ser. No. 11/042,732, filed on Jan. 24, 2005 and a continuation-in-part application of U.S. application Ser. No. 11/198,218, filed on Aug. 5, 2005. The teachings in these three applications are incorporated herein in their entirety by reference.

BACKGROUND OF THE INVENTION

The present invention is generally directed to a method of play and apparatus for playing a live baccarat game. In particular, the present invention relates to a method for playing a live baccarat game and playing jackpot.

Baccarat is one of the more popular gambling games played in casinos or gaming establishments. As is well known, the game is played on an elongated table having a game board displayed along the upper surface of the table. The game board displays certain wagering areas, and the elongated table allows for the seating of multiple players or bettors (1-16) and the positioning of the multiple dealers (3) necessary for operating the casino game. Bettor locations are typically numbered on the table and each bettor location has an area designated for a wager on the bank hand and an area designated for a wager on the player hand. Baccarat uses a standard deck of 52 playing cards and is usually dealt from a shoe having multiple decks that have been shuffled together prior to the beginning of play.

A feature of conventional baccarat games is that they have relatively simple rules. However, the simplicity of the rules has led to a corresponding simplicity in the relatively few types of wagers which may be placed during the play of the game, which may limit interest on the part of the player(s) and thus further limit the casino in terms of profit and payout.

The embodiments described below address the above-described issues and needs.

SUMMARY OF THE INVENTION

Provided herein are methods and systems therefore for playing a modified live baccarat game. The methods allow the wagering on the live baccarat games according to conventional rules. In addition, the methods provided herein allow betting on a site bet or wager for jackpot. In some embodiments, outcomes of the jackpot betting can be determined by combinations of cards that involve at least one zero-point card, described below. In some other embodiments, outcomes of the jackpot betting can be determined by specific combinations of cards defined below. The present invention also provides a jackpot gaming method that allows the banker to make initial contributions for the jackpot game.

The method for playing live baccarat described herein includes the following steps:

dealing cards to a player hand and a bank hand according to a set of conventional baccarat rules, allowing at least a first player to place a bet on live baccarat, allowing at least a second player to place a bet on jackpot where the second player can be the same as or different from the first player, determining the outcome of the live baccarat game according to the set of conventional baccarat rules, and determining the outcome of the jackpot according to a combination of cards defined herein.

The present invention also discloses a software program or a set of software programs for carrying out any or all steps of the betting method described herein. The live baccarat game can also be incorporated into an electronic device or an entertainment gaming machine.

BRIEF DESCRIPTION OF DRAWINGS

FIGS. 4A and 4B show the detailed layout of the betting terminal of a baccarat machine.

DETAILED DESCRIPTION

Figure 1:
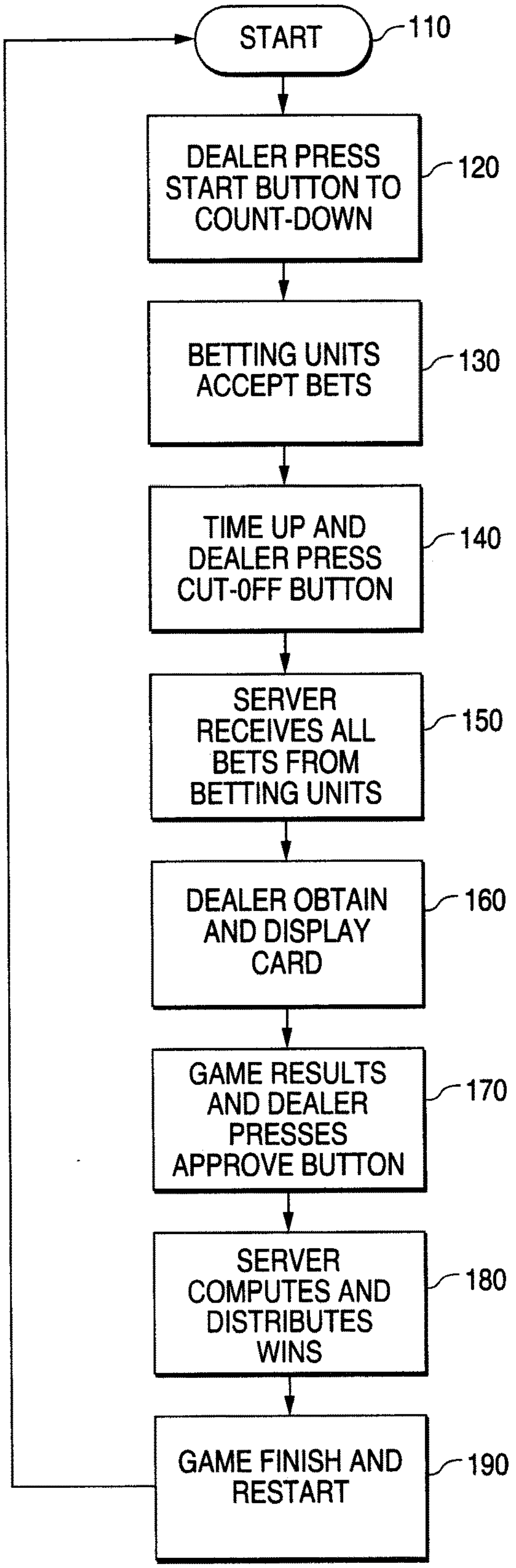
FIG. 1 is a flow chart disclosing the incorporation of the present betting methods in the game of baccarat.

Provided herein are methods and systems therefore for playing a modified live baccarat game. The methods allow the wagering on the live baccarat games according to conventional rules. In addition, the methods provided herein allow betting on a site bet or wager for jackpot. The present invention also provides a jackpot gaming method that allows the banker to make initial contributions for the jackpot game. As used herein, a zero-point card refers to any of the 10, J, Q, or K, and the banker refers to one who owns or operates the live baccarat establishment.

In general, the method for playing live baccarat described herein includes the following steps:

dealing cards to a player hand and a bank hand according to a set of conventional baccarat rules, allowing at least a first player to place a bet on live baccarat, allowing at least a second player to place a bet on jackpot where the second player can be the same as or different from the first player, determining the outcome of the live baccarat game according to the set of conventional baccarat rules, and determining the outcome of the jackpot according to a combination of cards defined below.

In some embodiments, the outcome of the jackpot can be a winning jackpot by from 1% to 100% of the jackpot, e.g., about 5%, about 10%, about 15%, about 20%, about 25%, about 30%, about 35%, about 40%, about 45%, about 50%, about 55%, about 60%, about 65%, about 70%, about 75%, about 80%, about 85%,about 90%, about 95%, or about 100% of the jackpot. As used herein, the term "about" shall encompass any percentage that falls within ±5% of the indicated value.

The present invention also provides a software program or a set of software programs for carrying out any or all steps of the betting method described herein. The baccarat game can also be incorporated into an electronic device or an entertainment gaming machine. Representative electronic devices include, but are not limited to, laptop computers or desktop computers.

Live Baccarat Game

The object of baccarat is for the bettor to successfully wager on whether the bank's hand or the player's hand is going to win. The bettor receives even money for his wager if he selects the winning hand and loses his wager if he selects the losing hand. Because of the rules of play of baccarat, the bank's hand has a slightly higher chance of winning than does the player's hand. Therefore, if the bettor wagers on the bank's hand, the bettor is required to pay to the gaming establishment a commission (typically 5%) of the amount the bettor wins. No commission is paid if the bettor successfully wagers on the player's hand.

The term "wager", as used herein, can be used interchangeably with the term "bet." The term "wagering" is used interchangeably with the term "betting."

Conventional methods of playing baccarat are described as follows:

A multiple number of decks of standard playing cards, 52 in number, are used; typically six to twelve decks are shuffled together and placed in a shoe from which the cards are dealt during the play of the game.

Each bettor makes a wager on whether the bank's hand or the player's hand will win. After all wagers are made, two cards are dealt from the shoe to the bank position and two cards are dealt from the shoe to the player's position on the table layout. The cards are turned face up and the value of the bank hand and the player hand is determined.

Aces count as one; kings, queens, jacks and tens count as zero and the other cards count as their respective face value. The suits (hearts, diamonds, spades and clubs) have no meaning in baccarat. The highest hand value in baccarat is nine. All hand values range from a low of zero to a high of nine. If when the cards are added together, the total of the hand exceeds nine, then the hand value is determined by subtracting ten from the total of the hand. For example, a seven and nine total sixteen, but the hand value is six. An Ace and a nine total ten, but the hand value is zero.

A two card total of eight or nine is called a "natural"; a two card total of zero is called a "baccarat". As will be explained hereafter, in certain situations in the play of the game, a third card will be dealt. The value of this third card is added to the total of the first two cards and a new hand value is established. Again, if the new hand total exceeds nine, the hand value is determined by subtracting ten from the total of the hand. Wagering locations are provided on the baccarat table layout. Whichever of the bank hand or the player hand is closest to a total of nine is the winner.

The way of betting may differ in different gaming establishments. In the U.S., for example, prior to the deal, each bettor can make one of three wagers: 1) that the bank hand will win, 2) that the player hand will win, or 3) that the bank hand and the player hand will tie. In Macau, for example, one can make one of five wagers: 1) that the bank hand will win, 2) that the player hand will win, 3) that the bank hand and the player hand will tie, 4) that the first two cards in the bank hand are of the same kind, regardless of the type of suit, forming a Bank Pair, or (5) that the first two cards in the player hand are of the same kind, regardless of the type of suit, forming a Player Pair.

All winning bank hand wagers in scenario 1) in both the U.S. and Macau are paid off at odds of one-to-one and the house charges a five percent (5%) commission on the amount won by the bettor. For example, if a bettor wagers $100 on the bank hand and the bank hand wins, the bettor wins $100 and is charged a $5 commission on the amount that the bettor won. The bettor is not charged any commission on the amount of his wager.

All wagers that select winning player hand in scenario 2) in both the U.S. and Macau are paid off at odds of one-to-one and the bettor is not charged any commission on the amount of his winnings or his wager.

All winning wagers on the tie in scenario 3) in both the U.S. and Macau can be paid off at odds of eight-to-one (depending on the gaming establishment) and the bettor is not charged any commission on the amount of his winnings or his wager. If a tie hand occurs, all wagers on the bank hand and all wagers on the player hand are "pushes" and the amount wagered is returned to the bettor.

All winning wagers on the Bank Pair bet in scenario 4) in Macau can be paid off at odds of eleven-to-one (depending on the gaming establishment) and the bettor is not charged any commission on the amount of his winnings or his wager.

All winning wagers on the Player Pair bet in scenario 5) in Macau can be paid off at odds of eight-to-one (depending on the gaming establishment) and the bettor is not charged any commission on the amount of his winnings or his wager.

The play of baccarat typically uses three casino dealers to operate the game. The casino dealers jointly participate in the shuffling of the decks of cards. After the shuffle is completed, one of the players is typically asked to cut the decks using a plastic cut card. The dealer then separates and restacks the cards from the point of the cut and the dealer or a player then inserts the plastic cut card no less than fifteen cards (in Las Vegas, U.S.) or no less than twelve cards (in Macau) from the ends of the stacked decks and the entire stacked decks are placed into a shoe from which the cards are dealt during the play of the game. When the inserted plastic cut card appears during play, the hand in progress is completed and that round of play then ends. The cards are reshuffled to prepare for the next round of baccarat.

In conventional baccarat, the bettors deal the cards used in the game. Initially, one of the casino dealers (called the "caller") passes the shoe to the bettor sitting in seat number "1" at the baccarat table. After all wagers have been made, the caller tells the bettor with the shoe to begin the deal. The bettor deals a first card to the caller, a first card to himself, a second card to the caller and a second card to himself. All cards are dealt face down. The two cards given to the caller represent the player hand and the two cards kept by the bettor who is dealing the cards represent the bank hand.

The caller than allows one of the other bettors to turn up the player's hand. Traditionally, this honor is given to the bettor who has made the largest wager. The bettor turns up the two cards of the player's hand and tosses them to the caller. The caller places these two cards face up in the table location designated for the "player hand" and the caller announces the point total of the player hand.

The bettor who has the shoe then turns over the cards of the bank hand and tosses these two cards to the caller. The caller places these two cards face up in the table location designated for the "bank hand" and the caller announces to point total of the bank hand. Depending on the point total of the player's hand and the bank's hand, one more card may be dealt to either the player's hand, the bank's hand, or both. The rules for determining whether a third card is dealt are fixed rules, there is no discretion for either the player's hand or the bank's hand on whether a third card is dealt.

If either the player hand or the bank hand has a point total of eight or nine on the first two cards, no third card is dealt to either hand and the hand with the highest point total is the winner (or the hand is a tie, as the case may be). If neither the player hand or the bank hand has a point total of eight or nine, then there is a possibility of a third card draw.

The third card draw rules are as follows:

Rule #1: If the initial two card player hand has a point total of 0, 1, 2, 3, 4 or 5, draws a third card. If the initial two card player hand has a point total of 6 or 7, the player hand stands and does not receive a third card.

Rule #2: If the player hand stands and does not draw a third card, then the bank hand follows Rule #1. In other words, if the player hand has a point total of 6 or 7, the bank hand draws a third card on a point total of 0, 1, 2, 3, 4 or 5 and the bank hand stands on a point total of 6 or 7.

Rule #3: If the player hand draws a third card, the bank hand must draw or stand as described in Table 1.

TABLE 1

| Bank hand two card point total | Bank hand draws when the player's hand third card is: | Bank hand stands when the player's hand third card is: |
|---|---|---|
| 0, 1 or 2 | Bank always draws | |
| 3 | 0, 1, 2, 3, 4, 5, 6, 7 or 9 | 8 |
| 4 | 2, 3, 4, 5, 6 or 7 | 0, 1, 8 or 9 |
| 5 | 4, 5, 6 or 7 | 0, 1, 2, 3, 8 or 9 |
| 6 | 6 or 7 | 0, 1, 2, 3, 4, 5, 8 or 9 |
| 7 | | Bank always stands |

All third card draw determinations are automatically made by the caller who is skilled in the game of baccarat. When the rules of baccarat require a third card for the player hand, the caller will request a card for the player hand. After the player hand is completed, the bank hand is completed in the same fashion. The caller then declares which hand has the highest point total and declares that hand the winner (or the caller declares a tie hand as the case may be).

In conventional baccarat the bettor who acts as the dealer continues to deal the cards until the player hand wins. As soon as the player hand wins, it is customary to pass the shoe counterclockwise around the baccarat table to the next bettor so that each bettor has the opportunity to deal the cards. Any bettor may decline to deal the cards. The fact that one of the bettors is physically dealing the cards has no affect on the outcome of the game because the rules for drawing and standing do not allow any discretion on the part of the players.

The players can play the game according to conventional baccarat rules, which may vary from place to place. In one embodiment, the baccarat game is played according to the U.S. rules as used in Las Vegas. In another embodiment, the baccarat game is played according to the baccarat rules promulgated by the government of Macau Special Administration Region.

In some embodiments, there is a maximum limit on the total bet can be made through a single betting terminal for the live baccarat game. In one embodiment, the maximum bet can be made through one terminal for live baccarat is, for example, HK$20,000.

Jackpot

The method and system described herein provide a method for jackpot betting, Paradise Jackpot™. The players of the live baccarat game can make a separate bet for jackpot. The jackpot bet can be placed with a bet for live baccarat or without a bet for the same live baccarat.

In some embodiments, the outcome of the jackpot betting is determined by the combination of cards that includes zero-point cards. The combination includes at least one zero-point cards, which are 10, J, Q and K. In one embodiment, the rules for playing Paradise Jackpot™ are described below:

(1) The gaming system provides a jackpot. Players who wish to bet on the Paradise Jackpot™ can place a separate bet, e.g. HKD 20 per game in minimum, which will be referred to as bet unit. The maximum number of bet units will not be restricted.

(2) Players can bet in Paradise Jackpot™ without placing bet in the same live baccarat game. Each player can place more than one bet unit in one game. When the Paradise Jackpot™ is won, the payout for each bet unit will be equal to the money in the Paradise Jackpot™ pool divided by the total number of bet unit.

(3) If the first 5 cards drawn in one baccarat game resulting in A, K, Q, J, 10 in spade, regardless of the sequence, then 100% of the Paradise Jackpot™ is won.

(4)If the first 5 cards drawn in one baccarat game resulting in K, Q, J, 10 in spade and A in either heart, club or diamond, regardless of the sequence, then 10% of the Paradise Jackpot™ is won. In some embodiments, the winning combinations for 10% of the jackpot can be any of the following Spade A plus K,Q,J,10 in Heart, Club or Diamond;
Heart A plus K,Q,J,10 in Spade, Club or Diamond;
Club A plus K,Q,J,10 in Spade, Heart or Diamond; or
Diamond A plus K, Q, J, 10 in Spade, Heart, or Club.

In some other embodiments, the Paradise Jackpot™ can be played according to Rules (I)-(III), defined below:

(I) The Paradise Jackpot™ is won if any of the following is met:

1) any five cards forming a sequence, regardless of the order they are drawn, e.g., A,2,3,4,5 or 9,10,J,Q,K;

2) five cards of a kind, e.g. A,A,A,A,A or K,K,K,K,K;

3) four cards of a kind, regardless of the order they are drawn, e.g., K,K,K,K,2 or 2,K,K,K,K;

4) three cards of a kind plus a pair, regardless of the order they are drawn, e.g., 10,10,10,2,2;

5) three cards of a kind, regardless of the order they are drawn, e.g., 2,2,2,10,J 6) two pairs, regardless of the order they are drawn, e.g., Q,Q,2,K,K;

7) all the 5 cards of the same symbols (same suit): spade, heart, club or diamond, e.g., A(spade),10(spade),J(spade),K (spade),Q(spade); or 8) any specific combination of five cards as specified from time to time.

(II) The Paradise Jackpot™ is won by any specific combination of the first four, three or two cards drawn in a live baccarat game, with regard to/regardless of the drawn sequence. Specifically, the Paradise Jackpot™ is won if any of the following is met:

(A) if the first four cards that are drawn form a combination as defined below:

1) the first four cards forming a sequence, with regard to/regardless of the order they are drawn, e.g., A,2,3,4, or 10,J,Q,K;
2) the first four cards of a kind, e.g. A,A,A,A or J,J,J,J;
3)three cards of a kind, with regard to/regardless of the order they are drawn, e.g., K,K,K,2 or 10,10,10,2;
4)two cards of a kind plus a pair, with regard to/regardless of the order they are drawn, e.g., 2,2,J,J, which is a two pair sequence;
5)two cards of a kind, with regard to/regardless of the order they are drawn, e.g., 10,10,Q,Q;
6)all the four cards of the same symbols (same suit): spade, heart, club or diamond, e.g., A(spade),10 (spade),J(spade),K(spade); or
7) any specific combination of the first four cards as specified from time to time, (B) if the first three cards that are drawn form a combination as defined below:

1) the first three cards forming a sequence, with regard to/regardless of the order they are drawn, e.g., A,2,3, or 10,J,K;
2) the first three cards of a kind, e.g. A,A,A or 2,2,2;
3) two cards of a kind, with regard to/regardless of the order they are drawn, e.g., K,K,2 or 10,10,2;
4) two cards forming a pair, with regard to/regardless of the order they are drawn, e.g., 2, J,J or J,J,2;
5) all the three cards of the same symbols (same suit): spade, heart, club or diamond, e.g., A(spade),J(spade), K(spade); or
6) any other specific combination of the first four cards as specified from time to time, or (C) if the first two cards that are drawn form a combination as defined below:

1) the first two cards forming a sequence, with regard to/regardless of the order they are drawn, e.g., A,2, or J,Q;
2) the first two cards of a kind, e.g. A,A or 10,10, which is also a pair;
3) the first two cards of the same symbols (same suit): spade, heart, club or diamond, e.g., A(spade),10 (spade); or
4) any other specific combination of the first four cards as specified from time to time.

(III) The Paradise Jackpot™ is won by any specific combination of the last six, five, four, three, and two cards drawn in a live baccarat game, with regard to/regardless of the drawn sequence. Specifically, the Paradise Jackpot™ is won if any of the following is met:

(A) if the last six cards that are drawn from a combination as defined below:

1) the last six cards forming a sequence, with regard to/regardless of the drawn sequence they are drawn, e.g., A,2,3,4,5,6 or 8,9,10,J,Q,K;
2) six cards of a kind, e.g. A,A,A,A,A,A or 2,2,2,2,2,2;
3) five cards of a kind, with regard to/regardless of the order they are drawn, e.g., K,K,K,K,K,2 or 2,10,10,10, 10,10;
4) four cards of a kind, with regard to/regardless of the order they are drawn, e.g., K,K,K,K,2,10 or 2,A,J,J,J,J;
5) four cards of a kind plus a pair, with regard to/regardless of the order they are drawn, e.g., K,K,K,K,2,2 or 2,2, J,J,J,J;

6) three cards of a kind plus a pair, with regard to/regardless of the order they are drawn, e.g., 2,2,2,J,J,A or J,J,2,2,2,K;
7) three cards of a kind, with regard to/regardless of the order they are drawn, e.g., A,A,A,10,J,K or 10,J,K,2, 2,2;
8) three pairs, with regard to/regardless of the order they are drawn, e.g., Q,Q,K,K,J,J or 2,2,10,10,K,K;
9) all the six cards of the same symbols (same suit): spade, heart, club or diamond, e.g., A(spade),10(spade),J (spade),K(spade),Q(spade),2(spade); or
10) any other specific combination of six cards as specified from time to time. (B) if the last five cards that are drawn from a combination as defined below:

1) the last five cards forming a sequence, with regard to/regardless of the order they are drawn, e.g., A,2,3,4,5 or 9,10,J,Q,K;
2) five cards of a kind, e.g. A,A,A,A,A or 2,2,2,2,2;
3) four cards of a kind, with regard to/regardless of the order they are drawn, e.g., K,K,K,K,2 or 2,10,10,10,10;
4) three cards of a kind plus a pair, regardless of the order they are drawn, e.g., 2,2,2,J,J;
5) three cards of a kind, regardless of the order they are drawn, e.g., 2,2,2,10,Q;
6) two pairs, regardless of the order they are drawn, e.g., Q,Q,A,10,10; 7) all the 5 cards of the same symbols (same suit): spade, heart, club or diamond; e.g., A(spade),10(spade),J(spade),K(spade),Q(spade); or
8) any other specific combination of five cards as specified from time to time, (C) if the last four cards that are drawn form a combination as defined below:

1) the last four cards forming a sequence, with regard to/regardless of the order they are drawn, e.g., A,2,3,4, or 10,J,Q,K;
2) the last four cards of a kind, e.g. A,A,A,A or 10,10, 10,10; 3) three cards of a kind, with regard to/regardless of the order they are drawn, e.g., K,K,K,2 or 10,10,10,2;
4) two cards of a kind plus a pair, regardless of the order they are drawn, e.g., A,A,J,J, which is a two pair sequence;
5) two cards of a kind, regardless of the order they are drawn, e.g., 2,2,Q,Q;
6) all the four cards of the same symbols (same suit): spade, heart, club or diamond, e.g., A(spade),10 (spade), K(spade),Q(spade); or
7) any other specific combination of the first four cards as specified from time to time, (D) if the last three cards that are drawn from a combination as defined below:

1) the last three cards forming a sequence, with regard to/regardless of the order they are drawn, e.g., A,2,3, or J,Q,K;
2) the last three cards of a kind, e.g. A,A,A or Q,Q,Q;
3) two cards of a kind, with regard to/regardless of the order they are drawn, e.g., K,K,2 or 10,10,2;
4)two cards forming a pair, with regard to/regardless of the order they are drawn, e.g., 2, J,J or J,J,2;
5) all the last three cards of the same symbols (same suit): spade, heart, club or diamond, e.g., A(spade), J(spade), K(spade); or
6) any other specific combination of the first four cards as specified from time to time, (E) if the last two cards that are drawn form a combination as defined below:

1) the last two cards forming a sequence, with regard to/regardless of the order they are drawn, e.g., A,2, or 10,J;
2) the last two cards of a kind, e.g. A,A or 2,2, which is also a pair;
3) the last two cards of the same symbols (same suit): spade, heart, club or diamond, e.g., A(spade),10 (spade); or
4) any other specific combination of the first four cards as specified from time to time.

The combinations of cards not defined above can be readily derived from time to time with or without the assistance of a computer following established rules of forming combinations of a set of defined members. The amount of Paradise Jackpot™ award can be determined by and distributed according to, e.g., the probability of a combination of cards as defined above or otherwise specified from time to time.

There may be more than one live baccarat game going on simultaneously in different casinos in Macau. In some embodiments, all Paradise Jackpot™ bets from different live baccarat tables will contribute to one grand Paradise Jackpot™ pool. If the Paradise Jackpot™ is won in any one live baccarat table, all players who place Paradise Jackpot™ bets, regardless of the live baccarat table they bet, will share the grand Paradise Jackpot™ pool according to the bet units that each player placed in the jackpot betting.

Paradise Jackpot™ can be played with bets from players as the sole source of the jackpot pool or with bets and an initial contribution from the banker. The term "banker" generally refers to the owner of a gaming establishment operating the live baccarat defined herein or one who operates the live baccarat game. In one embodiment, the banker contributes a sum of money as the initial Paradise Jackpot™ (e.g., HKD 50,000). A certain percentage, e.g., 55%, of the Paradise Jackpot™ bets from the players will be contributed towards the Paradise Jackpot™ pool, a certain percentage (e.g., 40%) of the bets will be collected by the banker as profit, and the remaining portion (e.g., 5%) of the bets will be accumulated as the seed for the next game.

An embodiment of the general gaming method described herein is shown in the flowchart in FIG. 1. The flowchart shows the steps in playing the live baccarat games described herein. Step 110 shows the baccarat is ready to start a game. In step 120, the dealer presses the Start button on the baccarat machine to count-down the time for accepting bets. In step 130, the betting terminal, BU, accepts bets. Step 140 shows that the time for accepting bets is over and the dealer press the Cut-off button on the machine. In step 150, the server, which is also referred to as betting computation and track record central processing unit (BCPU), receives all bets from betting terminals. The dealer then obtains and displays cards in step 160. In step 170, the baccarat game gives results and the dealer presses approve button, approving the card dealing made, game results and payouts. The server, BCPU, then computes and distributes wins in step 180. The live baccarat game is over, as shown in step 190, and the machine is ready for next round of baccarat game that begins with step 110.

In another aspect of the present invention, it is provided a software program or a set of software programs that allows a user or player to any or all of the various aspects of playing the live baccarat Paradise Jackpot™ described herein. The software program can be written by one of ordinary skill in the art.

Gaming System

Figure 2:
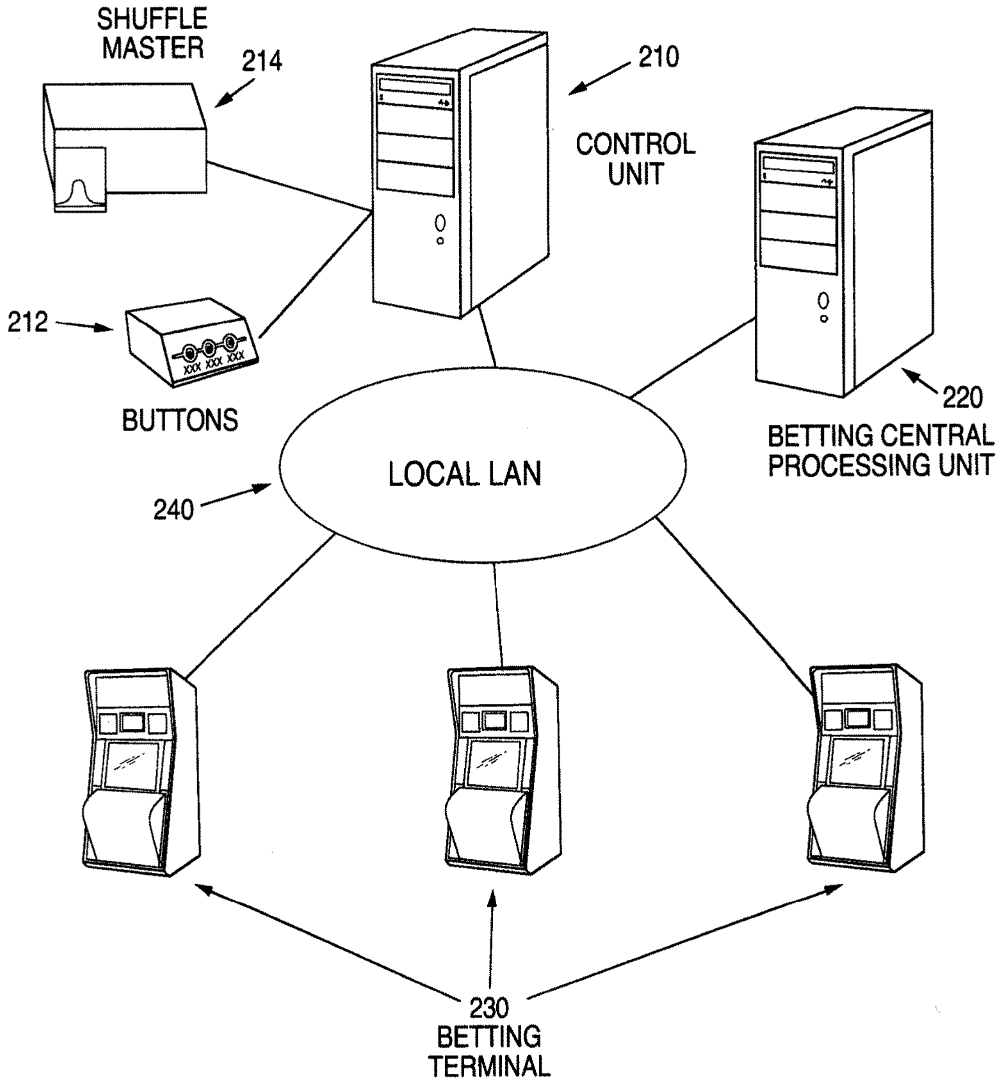
FIG. 2 shows a system embodying live baccarat jackpot of the present invention.

One aspect of the present invention provides a baccarat gaming system that allows one to play the live baccarat jackpot described herein. One embodiment of the present invention is shown in FIG. 2. Referring FIG. 2, the baccarat gaming system includes three members: (1) the control unit for automatic shuffle mechanism (CU) (210), (2) betting computation and tract record central processing unit (BCPU) (220), and (3) betting terminal for players (BT) (230) (FIG. 2). The control unit 210 may further contain control buttons (212) that allows the dealer to control the shuffling mechanism, which can be manual or automatic, and/or a shuffle master (214), which can be manual or automatic, for shuffling the cards. The CU 210 can include any or all of the components which may include control buttons that allow input from dealer and/or capable of (1) receiving the shuffle mechanism input, (2) sending visual output to a screen, and/or (3) sending card results in the player hand and/or bank hand to BCPU 220. The BCPU 220 has components or members capable of performing any or all of (1) receiving betting from BT (230), (2) receiving card results from CU 210, (3) sending betting results to BT 230, and/or (4) sending credit to BT 230.

The betting terminal for players, BT 230, has components or members capable of performing any or all of (1) sending betting to BCPU 220, (2) receiving betting results from BCPU 220, and/or (3) receiving credit from BCPU 220. Note, the baccarat gaming system can have a number of betting terminals, depending on the need of a gaming establishment. For example, if desirable, the baccarat gaming system can have 1, 2, 3, 4, 5, 6, 7, 8, 9, or 10, up to, e.g., 50 or 250 BTs. CU 210, BCPU 220, and BT 230 can be linked together via a local area network (LAN) (240) to form a baccarat gaming network between one, two, three or several gaming establishments.

The live baccarat game can have different variations. For example, the game can be played separately as a single live baccarat game. In some embodiments, the individual baccarat games as played in each betting terminal can be linked together. The individual games can all be played in a casino or gaming establishment or in several casino or gaming establishments. The individual games played in different betting terminals can be the same or different. Therefore, some or all of the baccarat games played in individual betting terminals, which can be the same or different baccarat games, can be linked together for a single jackpot.

Figure 3:
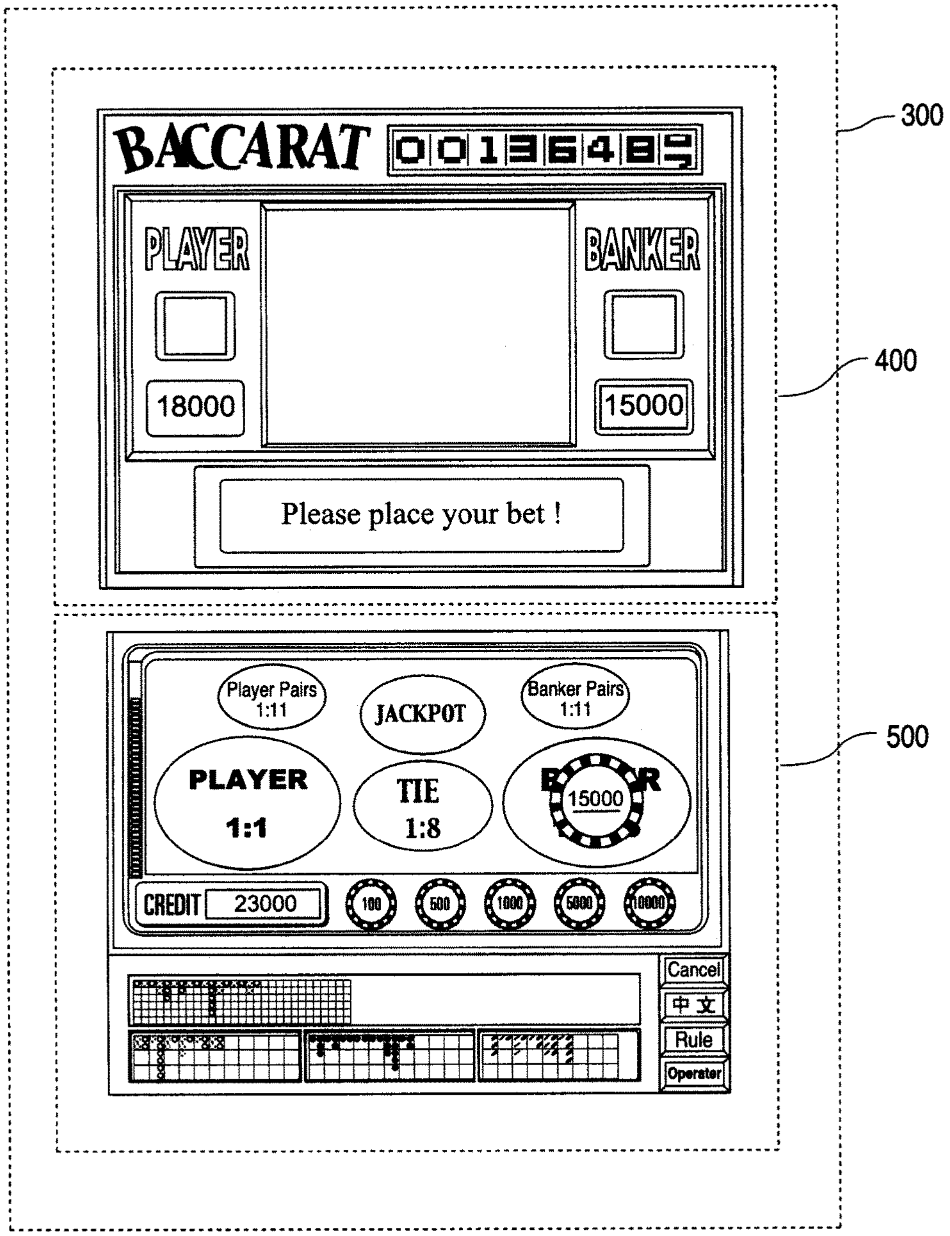
FIG. 3 shows the general layout of a baccarat machine.

A layout for the live baccarat game described herein is shown in FIGS. 3, 4A and 4B. FIG. 3 shows the overall layout of the betting terminal (300), which has two screens, the upper screen (400) and the lower screen (500), shown in detail in FIGS. 4 and B. Referring to FIG. 4A, upper screen 400 includes an upper part (410) for displaying the result, score and latest jackpot amount, the center part (420) for displaying a live video of the gambling table, and a messenger screen (430) for displaying messages. In one embodiment, the jackpot amount digits can be programmed to be in rolling motion to reflect the increasing jackpot pool. The center part of the upper screen has a section designated as Player (440), which has a small screen (450), and another section designated as Banker (460), which also has a small screen (470). The small screens 450 and 470 are for display of card values of the player hand and the bank hand respectively. The current limits available for betting on Player (player hand) and Banker (bank hand) in a live baccarat game are shown in small screens 480 and 490 below small screens 450 and 470, respectively.

Referring to FIG. 4B, the lower screen 500 is an operating touch screen for betting, which includes bet-option buttons (510), bet-amount buttons (520), and credit window (530). The bet-option buttons 510 include the various betting selections described above, e.g., betting for player hand (511) win with a payoff rate of 1:1, for the bank hand (512) win with a payoff rate of 1:0.95, for tie (513) with a payoff rate of 1:8, for Player Pairs (514) with a payoff rate of 1:11, for banker pairs (515) with a payoff rate of 1:11, and for Jackpot bet (516), the rules of which are described above. Box 517 shows the pops up when bets are placed on a particular bet option. The number inside Box 517 corresponds to the amount placed on a particular bet option. The bet-amount buttons 520 as shown in the layout, 100, 500, 1000, 5000, 10000, provide the players the convenience of adding up betting amounts in a fast manner. To illustrate, for a bet of 10,000 USD or HKD, the player can simply press the "1000" button ten times to reach the desired betting amount. Note, the bet-amount buttons 520 shown are illustrative and nonexclusive. Buttons designated for other amounts, e.g., "1", "5", "10", "100", "100,000", "1,000, 000" can be readily added to the screen. The credit window 530 shows the remaining balance of a player's credit. The player may insert bills or chips into or transfer money from a credit card account and/or a bank account to the machine to add up the credit amount from time to time. If the player desires to stop playing the baccarat game and to cash out, he may ask the operator to authorize a cash-out procedure, and then obtain the remaining balance.

Still referring to FIG. 4, the lower screen 500 further includes language selection button (540), which can switch the operation language of the baccarat game between, e.g., English, Portuguese, Italian, French, Spanish, Russian, German, Arabic, Japanese, and Korean, etc, Rule selection button (550), which prompts the display of rules for live baccarat and Paradise Jackpot™, Cancel button (560), which allows the bettor to cancel all bets made before the cards are dealt, Operator button (570), which allows the bettor to call for assistance from the casino staff when there is machine failure or the bettor wishes to exit from the game, and Results Bars (580, 590) which display the results for previous live baccarat games. Once results of a game are confirmed, the losing bet shown in the bet option buttons (510) in the center of lower screen will disappear while the winning bet in the bet option buttons (510) in the lower screen will flash with the total amount won.

Figure 4C:
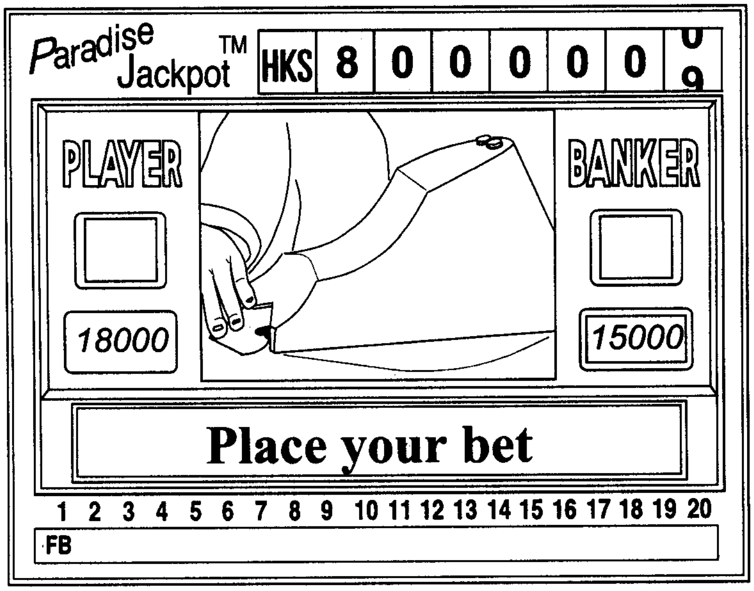
FIGS. 4C and 4D show a variant of the layout of the betting terminal shown in FIGS. 4A and 4B.

FIG. 4C is an alternative design of the upper screen 400 as shown in FIG. 4A, which has a similar layout as the one shown in FIG. 4A except that the top right corner of the upper screen displays the words "Paradise Jackpot™", and the bottom rim has a blank bar and numbers 1 through 20 on top of the bar.

Figure 4D:
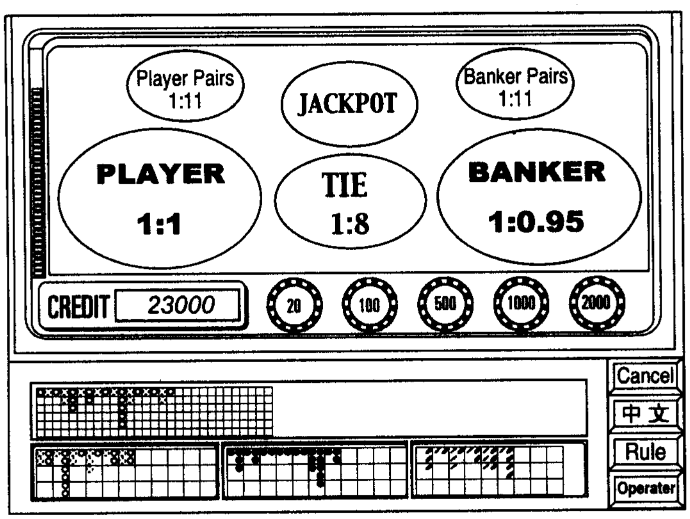

FIG. 4D is an alternative design of the lower screen of 500 as shown in FIG. 4B, which as a similar layout as the one shown in FIG. 4B except that the top rim of the lower screen 500 bears letters indicating the left side as the Player side and the right side and the Banker side, a screen at the far up-left corner indicating the maximum bet on the player hand accepted by the dealing table in a game, and a screen at the far up-right corner indicating the maximum bet on the banker hand accepted by the dealing table in a game.

Figure 5:
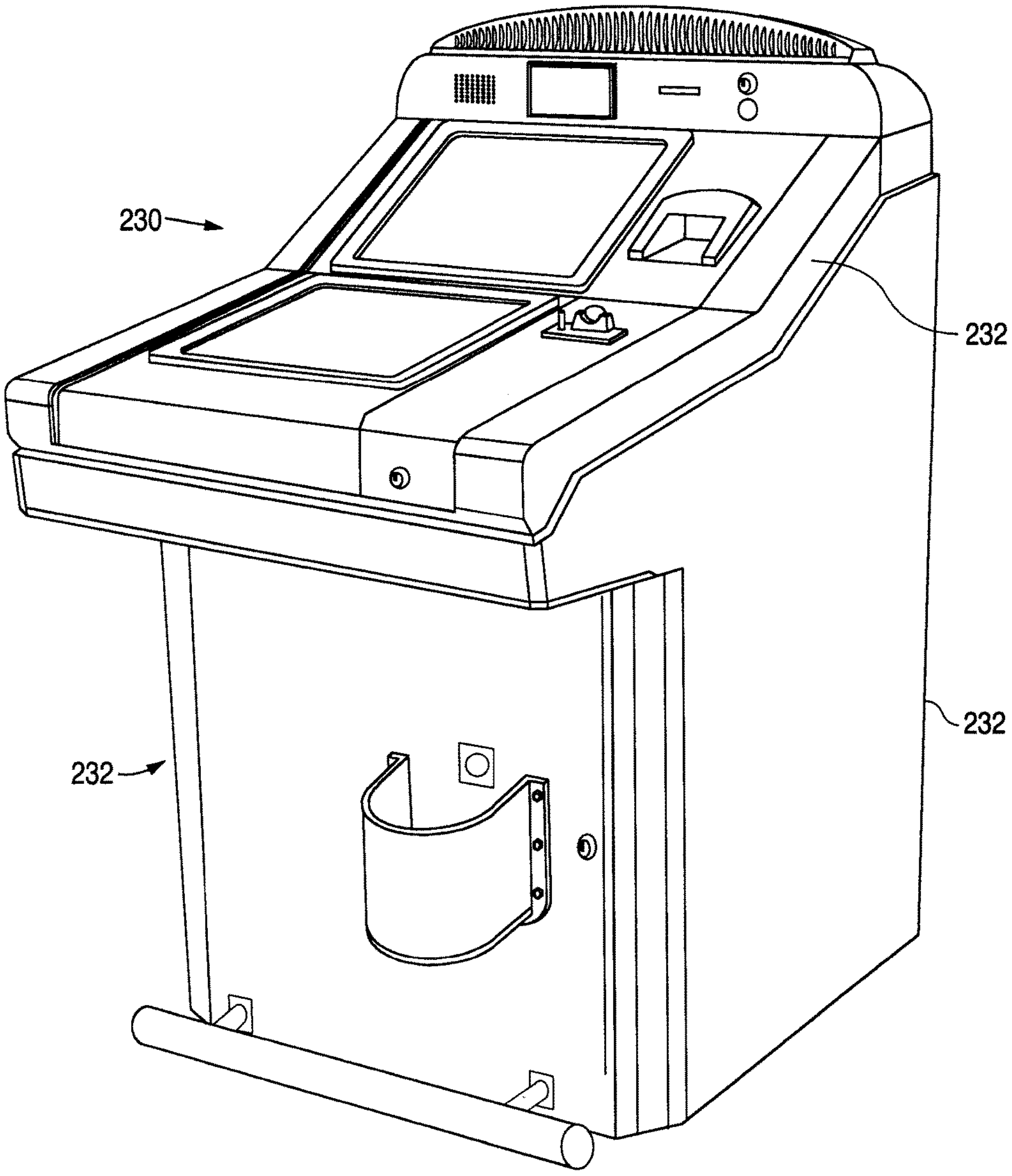
FIG. 5 shows an embodiment of the overall design of the betting terminal.
Figure 6:
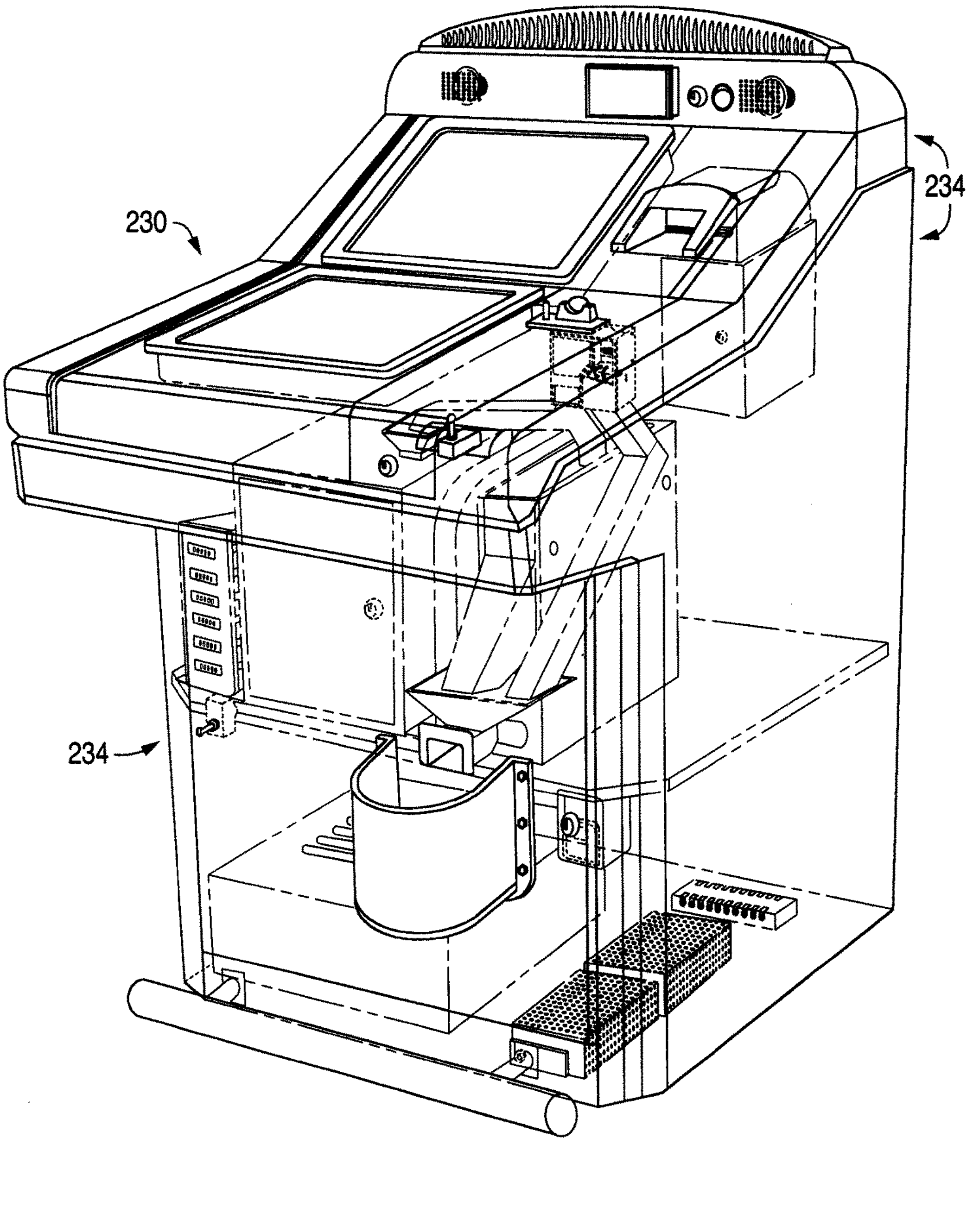
FIG. 6 shows another embodiment of the overall interior design of the betting terminal.

FIGS. 5 and 6 show two embodiments of the betting terminal (BT) 230. FIG. 5 shows an embodiment of BT 230 that has an opaque cover 232. FIG. 6 shows an embodiment of the interior design of BT 230.

Figure 7:
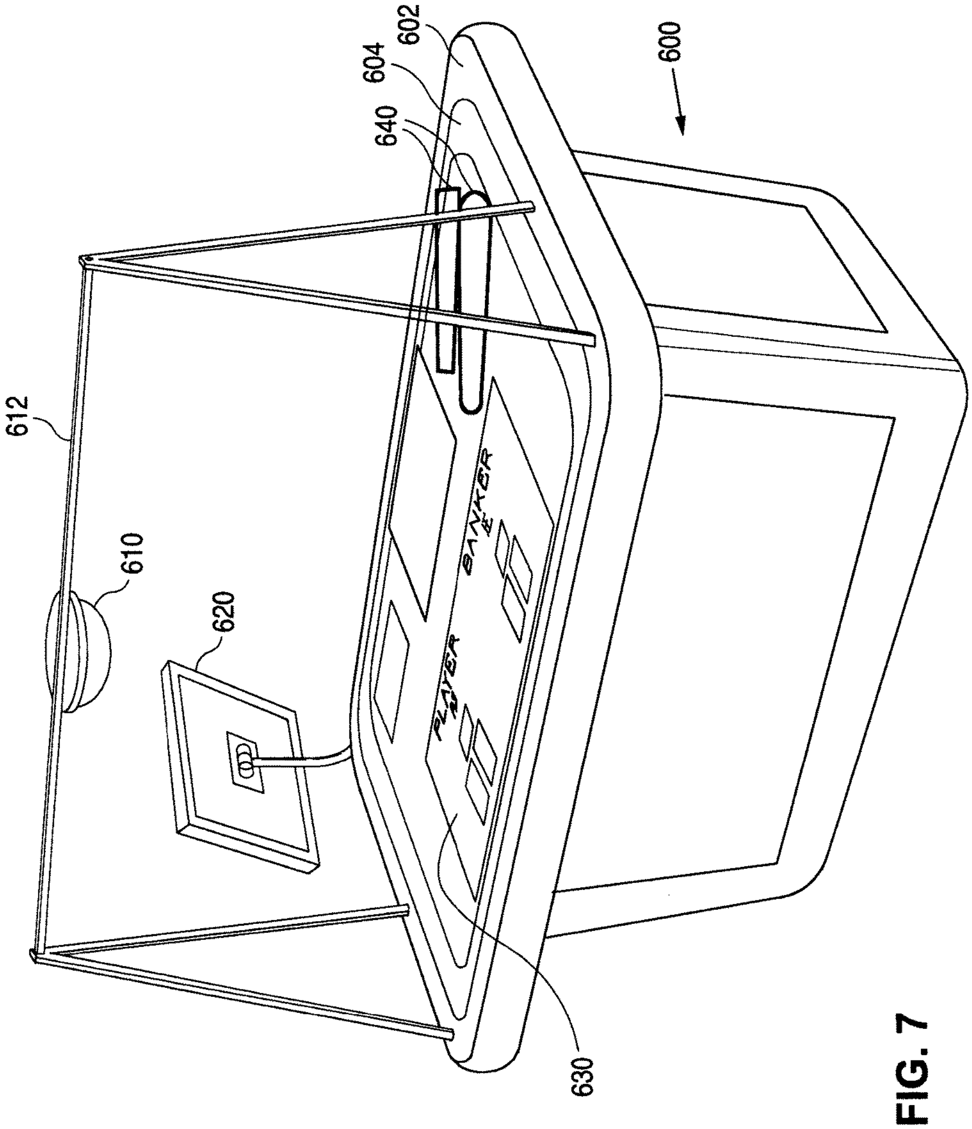
FIG. 7 shows an embodiment of the design of the dealing table.

In some embodiments, the gaming system includes a dealing table. An embodiment of the dealing table is shown in FIG. 7, which includes a main body 600, an overhead video camera 610 supported by a handle 612, a signaling mechanism (e.g., a touch screen) 620 for prompting the dealer of the dealing process, a lighting mechanism 630 for indication of the order the card dealing process, and rings 640 marking the space for placing the card shuffle master and box for disposal of played cards. The main body 600 has an outer rim 602 and inner rim 604.

Figure 8:
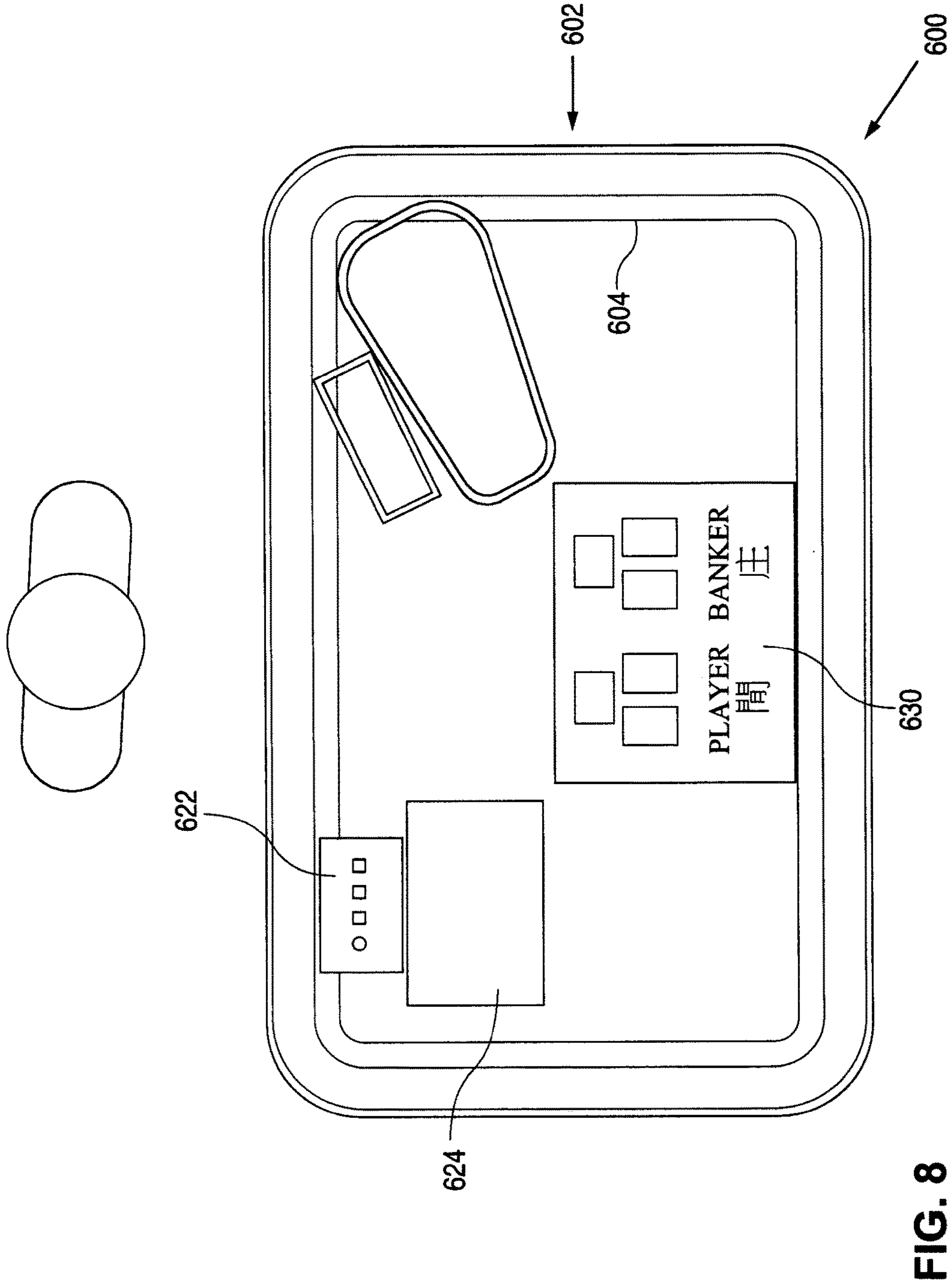
FIG. 8 shows an embodiment of the layout of the dealing table.

Another embodiment of the dealing table is shown in FIG. 8, which has a main body (DT 600), a touch screen 620 that includes a screen 622 and a pop up mechanism 624 for the touch screen, a lighting mechanism 630, and rings 640 marking the space for placing the card shuffle master and box for disposal of played cards. The main body 600 has an outer rim 602 and inner rim 604. In one embodiment, the main body 600 of the dealing table shown in FIG. 8 has an overall dimension of 1600 mm×1000 mm, the outer rim having an outer dimension of 1600 mm×1000 mm and an inner dimension of 1440 mm×840 mm, and the inner rim having an outer dimension of 1440 mm×840 mm and an inner dimension of 1350 mm×750 mm. The touch screen 620 includes a screen 622 having a dimension of 220 mm×130 mm and a pop up mechanism 624 having a dimension of 275 mm. The lighting mechanism has a dimension of 500 mm×400 mm.

Figure 9:
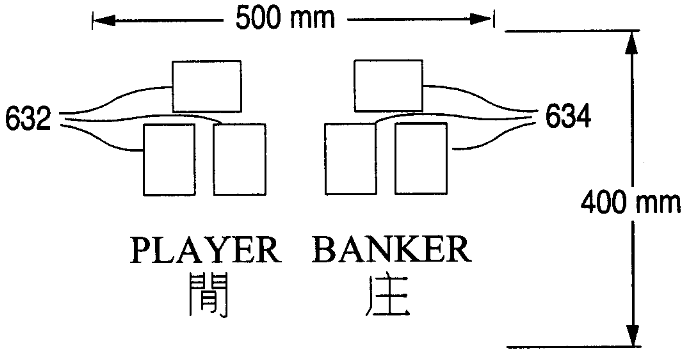
FIG. 9 shows an embodiment of the layout of the dealing table having lights indicating the order of the card dealing process.

FIG. 9 shows an embodiment of the lighting mechanism 630 of the dealing table as shown in FIG. 7 or 8. The lighting mechanism 630 includes lighting 632 indicating the next card shall be dealt to the Player and lighting 634 indicating the next card shall be dealt to the Banker. In one embodiment, the lighting mechanism can have a dimension of 500 m×400 mm.

Figure 10:
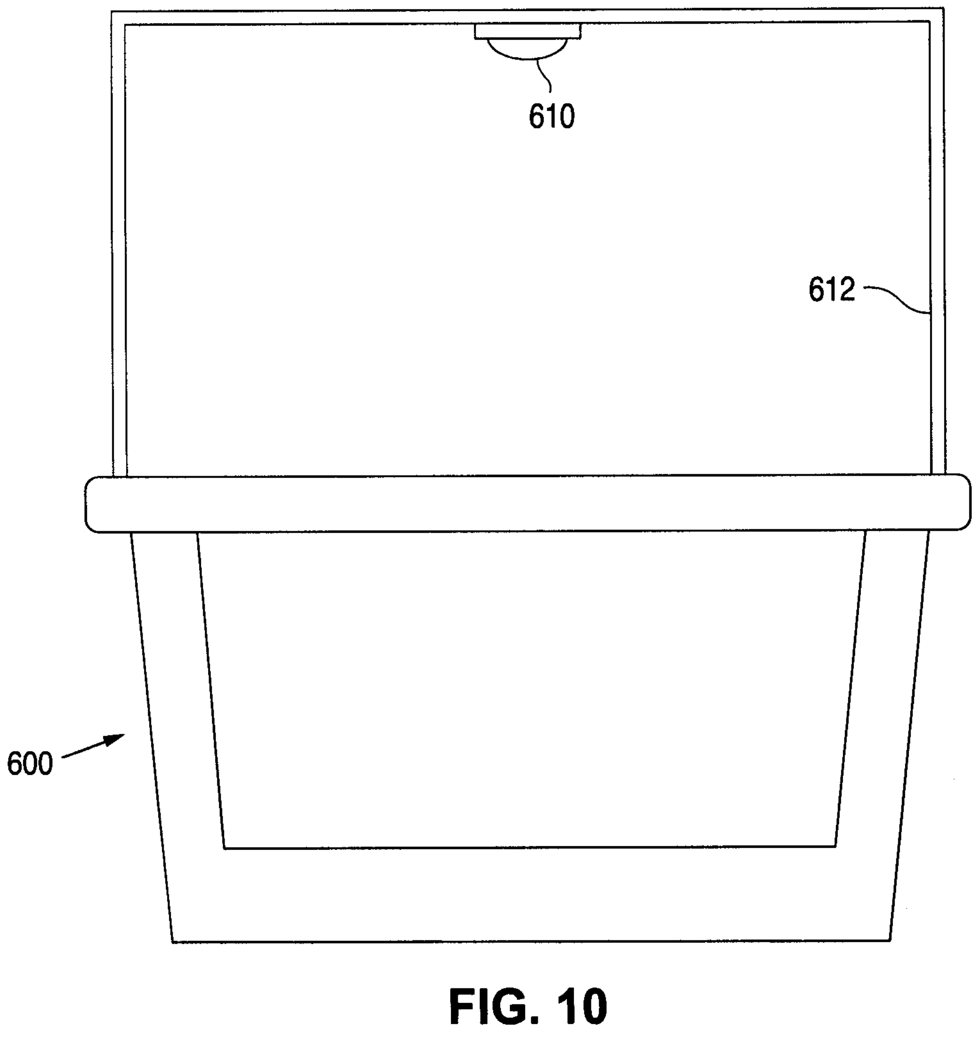
FIG. 10 shows the side view of a design of the dealing table.

FIG. 10 shows a side view of an embodiment of the dealing table of the present invention, which shows the main body 600 and the overhead video camera 610 supported by handle 612. In one embodiment, the main body 600 can have a length of 1600 mm and a height of 850 mm, and handle 612 can have a height of 850 mm.

Figure 11:
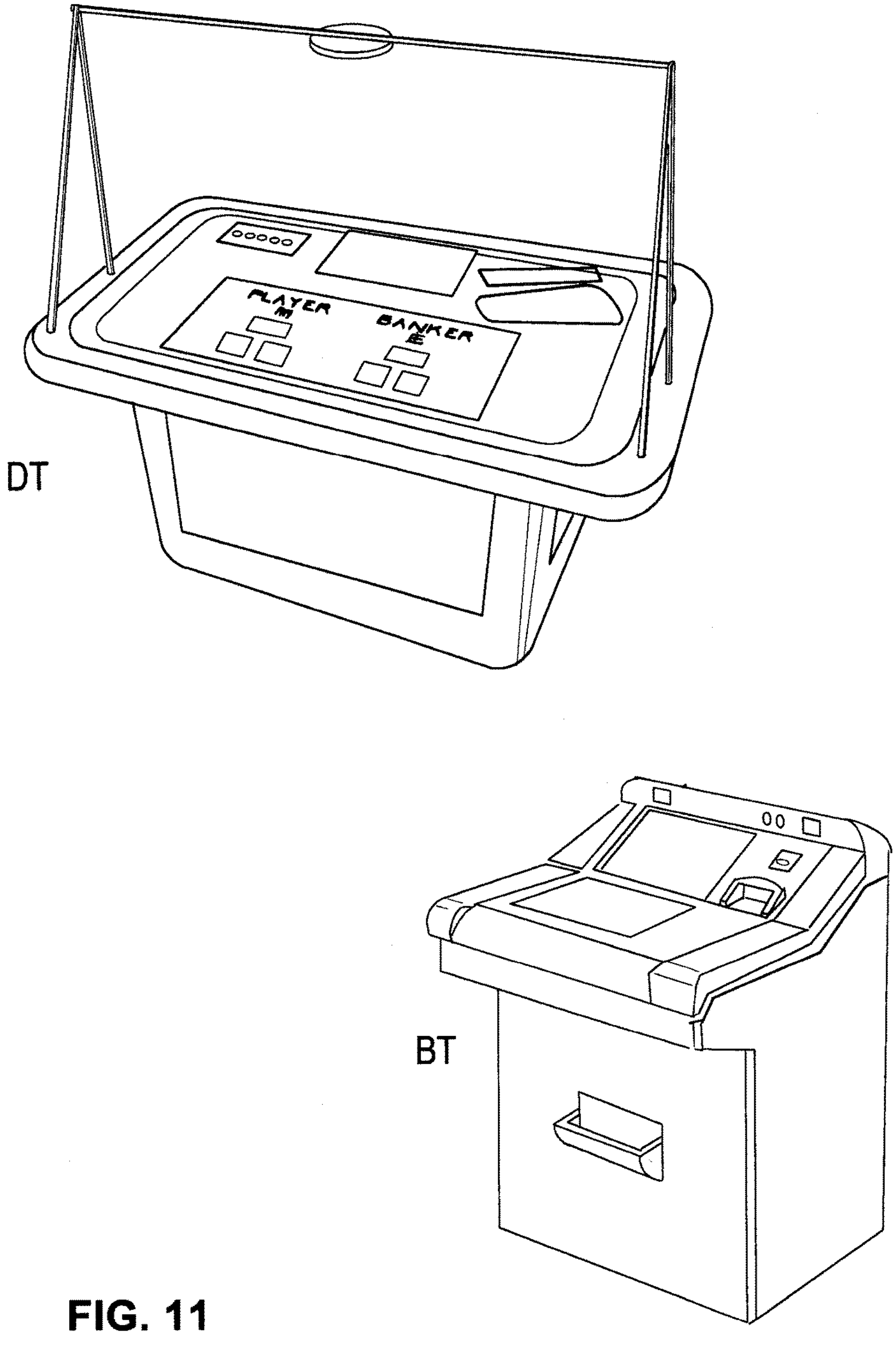
FIG. 11 shows an embodiment of the overall layout of betting terminals and the dealing table.
Figure 12:
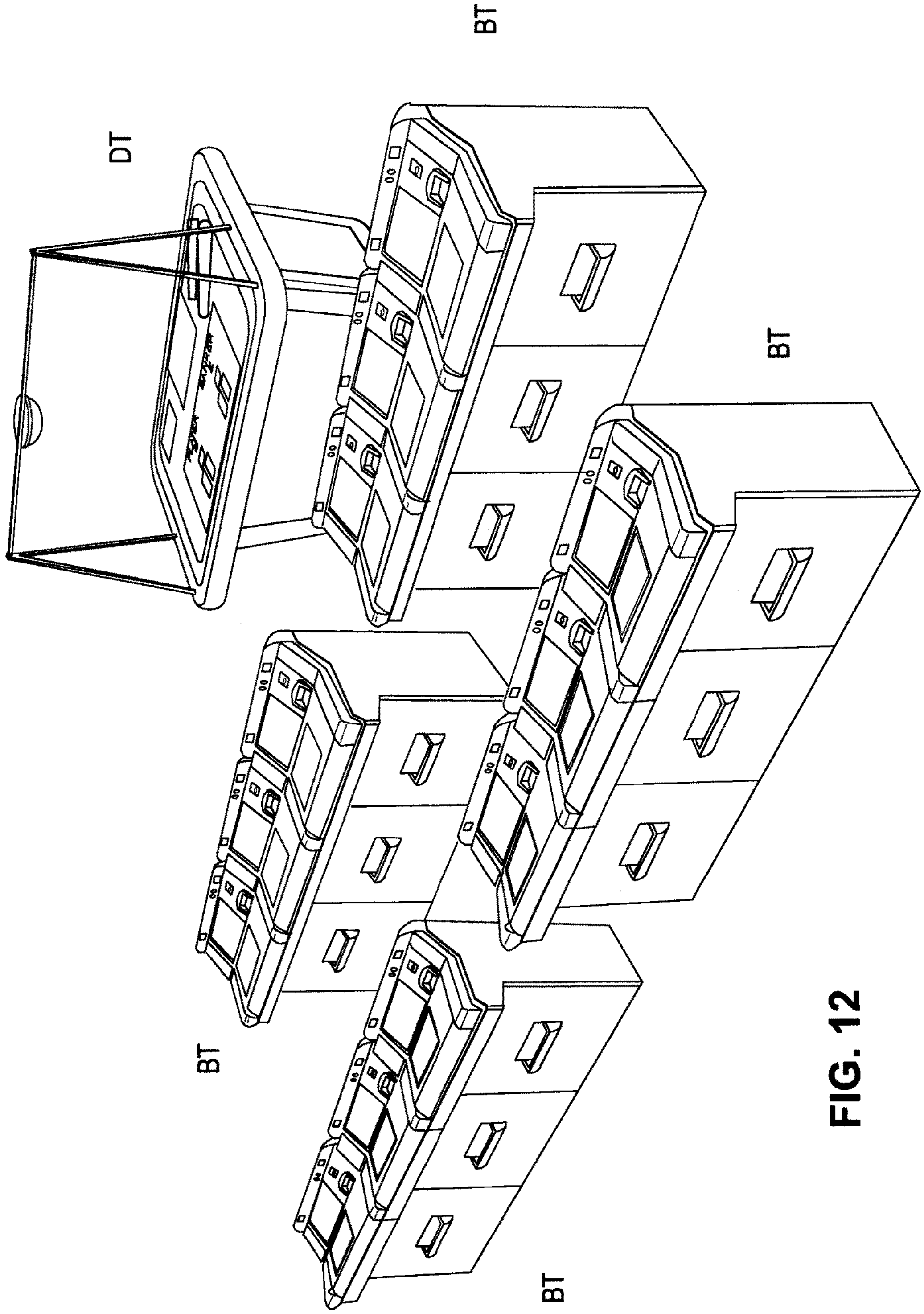
FIG. 12 shows an embodiment of one design of the Live Baccarat of present invention.
Figure 13:
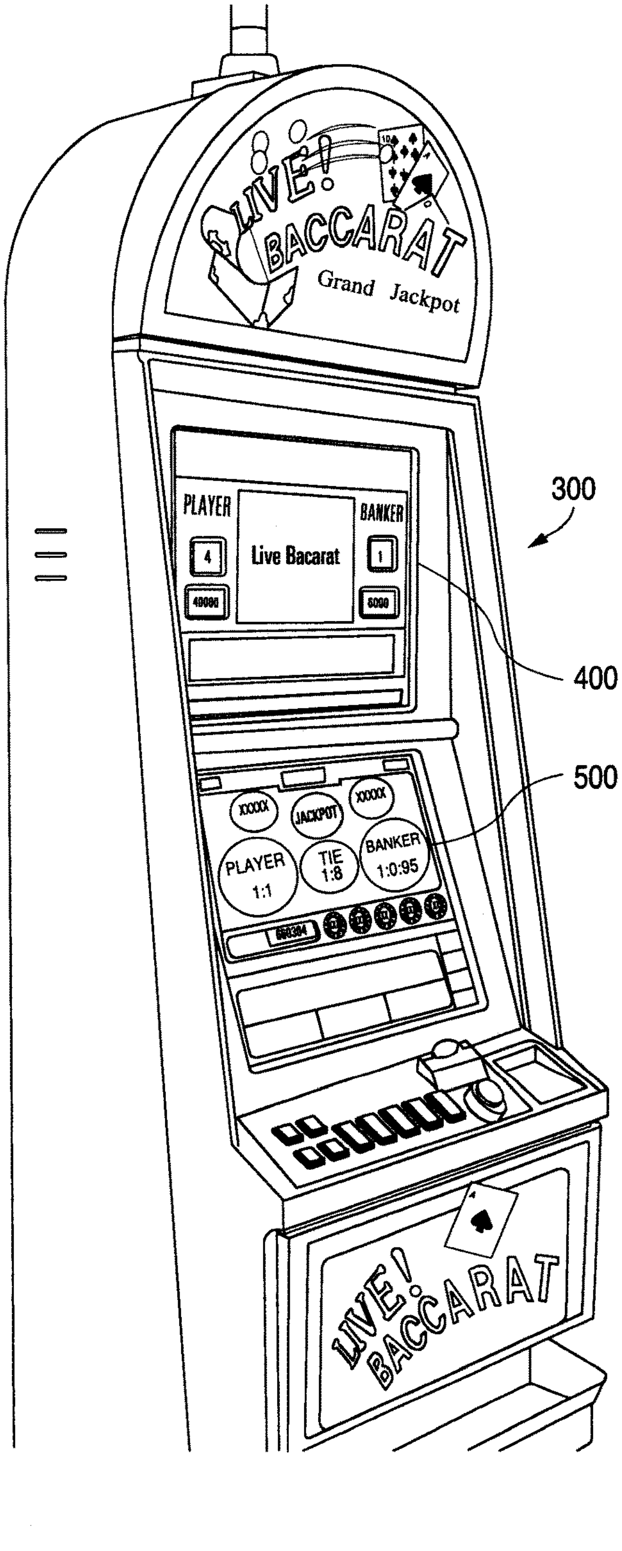
FIG. 13 shows an embodiment of another design of the Live Baccarat betting terminal of the present invention.

FIG. 11 shows an embodiment of the gaming system of the present invention that includes a dealing table and a betting terminal. FIG. 12 shows the overall layout of an embodiment of the gaming system of the present invention, which includes a dealing table and a plurality of betting terminals. FIG. 13 shows the overall layout of a further embodiment of the gaming system of the present invention.

In some other embodiments, the baccarat jackpot game can be played in an entertainment setting, e.g., in the form of game device such as laptop or desktop computers.

In a further embodiment, the baccarat jackpot game can be played in a non-baccarat game, e.g., blackjack, or showhand. The rules of these games other than baccarat games are known to one in the art.

While particular embodiments of the present invention have been shown and described, it will be obvious to those skilled in the art that changes and modifications can be made without departing from this invention in its broader aspects. Therefore, the appended claims are to encompass within their scope all such changes and modifications as fall within the true spirit and scope of this invention.

I claim:

1. A method of operating a gaming system, said method comprising:

at a first betting terminal of a plurality of betting terminals:

responsive to a physical item associated with a monetary value being received by an acceptor of said betting terminal, establishing a credit balance based at least in part on the monetary value associated with the received physical item;

enabling a first player to place a bet on a play of a live baccarat game played at a gaming table remote from the first betting terminal, for the play of the live baccarat game:

displaying, by at least one display device, a plurality of cards comprising at least two cards for a player hand and at least two cards for a bank hand, the displayed plurality of cards being associated with a plurality of physical cards dealt on the gaming table, and determining, by at least one processor and based on the displayed plurality of cards, an outcome of the play of the live baccarat game for the first player, and responsive to a cashout input being received, initiating a payout associated with the credit balance; and at a second betting terminal of the plurality of betting terminals:

enabling a second player to place a single bet on a jackpot associated with the play of the live baccarat game, determining a quantity of cards of the displayed plurality of playing cards, responsive to the second player placing the single bet on the jackpot and the determined quantity of cards of the displayed plurality of cards comprising six or more displayed cards, determining, by the at least one processor and based on at least four of the displayed plurality of cards, whether to provide the jackpot to the second player in association with the single bet placed on the jackpot, responsive to the second player placing the single bet on the jackpot and the determined quantity of cards of the displayed plurality of cards comprising five displayed cards, determining, by the at least one processor and based on at least four of the displayed plurality of cards, whether to provide the jackpot to the second player in association with the single bet placed on the jackpot, and responsive to the second player placing the single bet on the jackpot and the determined quantity of cards of the displayed plurality of cards comprising four or less displayed cards, determining, by the at least one processor and based on at least two of the displayed plurality of cards, whether to provide the jackpot to the second player in association with the single bet placed on the jackpot.

2. The method of operating a gaming system of claim 1, wherein responsive to the second player placing the single bet on the jackpot and the determined quantity of cards of the displayed plurality of cards comprising six or more displayed cards, the determination of whether to provide the jackpot to the second player in association with the single bet placed on the jackpot is based on six cards that are displayed last in the play of the live baccarat game forming a combination selected from the group consisting of: the last six cards forming a sequence; six cards of a kind; five cards of a kind; four cards of a kind; four cards of a kind plus a pair; three cards of a kind plus a pair; three cards of a kind; three pairs; and six cards of a same suit.

3. The method of operating a gaming system of claim 1, wherein responsive to the second player placing the single bet on the jackpot and the determined quantity of cards of the displayed plurality of cards comprising five displayed cards, the determination of whether to provide the jackpot to the second player in association with the single bet placed on the jackpot is based on five cards that are displayed last in the play of the live baccarat game forming a combination selected from the group consisting of: the last five cards forming a sequence; five cards of a kind; four cards of a kind; three cards of a kind plus a pair; three cards of a kind; two pairs; and five cards of the same suit.

4. The method of operating a gaming system of claim 1, wherein responsive to the second player placing the single bet on the jackpot and the determined quantity of cards of the displayed plurality of cards comprising four or less displayed cards, the determination of whether to provide the jackpot to the second player in association with the single bet placed on the jackpot is based on four cards that are displayed last displayed last in the play of the live baccarat game forming a combination selected from the group consisting of: the last four cards forming a sequence; the last four cards of a kind; three cards of a kind; two cards of a kind plus a pair; two cards of a kind; and four cards of the same suit.

5. The method of operating a gaming system of claim 1, wherein responsive to the second player placing the single bet on the jackpot and the determined quantity of cards of the displayed plurality of cards comprising four or less displayed cards, the determination of whether to provide the jackpot to the second player in association with the single bet placed on the jackpot is based on three cards that are displayed last displayed last in the play of the live baccarat game forming a combination selected from the group consisting of: the last three cards forming a sequence; the last three cards of a kind; two cards of a kind; two cards forming a pair; and three cards of the same suit.

6. The method of operating a gaming system of claim 1, wherein responsive to the second player placing the single bet on the jackpot and the determined quantity of cards of the displayed plurality of cards comprising four or less displayed cards, the determination of whether to provide the jackpot to the second player in association with the single bet placed on the jackpot is based on two cards that are displayed last displayed last in the play of the live baccarat game forming a combination selected from the group consisting of: the last two cards forming a sequence; two cards form a pair; and two cards of the same suit.

7. A gaming system comprising:

a first betting terminal comprising:

a first acceptor;

a first display device, a first processor, and a first memory device which stores a plurality of instructions, which when executed by the first processor, cause the first processor to:

responsive to a first physical item associated with a monetary value being received by the first acceptor, establish a first credit balance based at least in part on the monetary value associated with the received first physical item, cause the first display device to display a play of a live baccarat game played on a gaming table, receive a bet, placed by a first player, on the play of the live baccarat game, cause the first display device to display a plurality of cards comprising at least cards for a player hand and at least two cards for a bank hand, the displayed plurality of cards being associated with a plurality of physical cards dealt on the gaming table, determine, based on the displayed plurality of cards, an outcome of the play of the live baccarat game for the first player, and responsive to a cashout input being received, initiate a payout associated with the first credit balance; and a second betting terminal comprising:

a second acceptor;

a second display device, a second processor, and a second memory device which stores a plurality of instructions, which when executed by the second processor, cause the second processor to:

responsive to a second physical item associated with a monetary value being received by the second acceptor, establish a second credit balance based at least in part on the monetary value associated with the received second physical item, receive a single bet, placed by a second player, on a jackpot associated with the play of the live baccarat game, cause the second display device to display the play of the live baccarat game played on the gaming table, determine a quantity of cards of the displayed plurality of playing cards, responsive to the second player placing the single bet on the jackpot and the determined quantity of cards of the displayed plurality of cards comprising six or more displayed cards, determine, based on at least four of the displayed plurality of cards, whether to provide the jackpot to the second player in association with the single bet placed on the jackpot, responsive to the second player placing the single bet on the jackpot and the determined quantity of cards of the displayed plurality of cards comprising five displayed cards, determine, based on at least four of the displayed plurality of cards, whether to provide the jackpot to the second player in association with the single bet placed on the jackpot, responsive to the second player placing the single bet on the jackpot and the determined quantity of cards of the displayed plurality of cards comprising four or less displayed cards, determine, based on at least two of the displayed plurality of cards, whether to provide the jackpot to the second player in association with the single bet placed on the jackpot, and responsive to a cashout input being received, initiate a payout associated with the second credit balance.

8. The gaming system of claim 7, wherein responsive to the second player placing the single bet on the jackpot and the determined quantity of cards of the displayed plurality of cards comprising six or more displayed cards, the determination of whether to provide the jackpot to the second player in association with the single bet placed on the jackpot is based on six cards that are displayed last in the play of the live baccarat game forming a combination selected from the group consisting of: the last six cards forming a sequence; six cards of a kind; five cards of a kind; four cards of a kind; four cards of a kind plus a pair; three cards of a kind plus a pair; three cards of a kind; three pairs; and six cards of a same suit.

9. The gaming system of claim 7, wherein responsive to the second player placing the single bet on the jackpot and the determined quantity of cards of the displayed plurality of cards comprising five displayed cards, the determination of whether to provide the jackpot to the second player in association with the single bet placed on the jackpot is based on five cards that are displayed last in the play of the live baccarat game forming a combination selected from the group consisting of: the last five cards forming a sequence; five cards of a kind; four cards of a kind; three cards of a kind plus a pair; three cards of a kind; two pairs; and five cards of the same suit.

10. The gaming system of claim 7, wherein responsive to the second player placing the single bet on the jackpot and the determined quantity of cards of the displayed plurality of cards comprising four or less displayed cards, the determination of whether to provide the jackpot to the second player in association with the single bet placed on the jackpot is based on four cards that are displayed last displayed last in the play of the live baccarat game forming a combination selected from the group consisting of: the last four cards forming a sequence; the last four cards of a kind; three cards of a kind; two cards of a kind plus a pair; two cards of a kind; and four cards of the same suit.

11. The gaming system of claim 7, wherein responsive to the second player placing the single bet on the jackpot and the determined quantity of cards of the displayed plurality of cards comprising four or less displayed cards, the determination of whether to provide the jackpot to the second player in association with the single bet placed on the jackpot is based on three cards that are displayed last displayed last in the play of the live baccarat game forming a combination selected from the group consisting of: the last three cards forming a sequence; the last three cards of a kind; two cards of a kind; two cards forming a pair; and three cards of the same suit.

12. The gaming system of claim 7, wherein responsive to the second player placing the single bet on the jackpot and the determined quantity of cards of the displayed plurality of cards comprises four or less displayed cards, the determination of whether to provide the jackpot to the second player in association with the single bet placed on the jackpot is based on two cards that are displayed last displayed last in the play of the live baccarat game forming a combination selected from the group consisting of: the last two cards forming a sequence; two cards form a pair; and two cards of the same suit.

13. A betting terminal comprising:

an acceptor;

a display device, a processor, and a memory device which stores a plurality of instructions, which when executed by the processor, cause the processor to:

responsive to a physical item associated with a monetary value being received by the acceptor, modify a credit balance based at least in part on the monetary value associated with the received physical item, receive a single bet placed on a jackpot associated with a play of a live baccarat game played on a gaming table, determine a quantity of cards of a displayed plurality of playing cards of the play of the live baccarat game, responsive to the single bet being placed on the jackpot and the determined quantity of cards of the displayed plurality of cards comprising six or more displayed cards, determine, based on at least four of the displayed plurality of cards, whether to provide the jackpot in association with the single bet placed on the jackpot, wherein the displayed plurality of playing cards comprises at least cards for a player hand, at least two cards for a bank hand and is associated with a plurality of physical cards dealt on the gaming table, responsive to the single bet being placed on the jackpot and the determined quantity of cards of the displayed plurality of cards comprising five displayed cards, determine, based on at least four of the displayed plurality of cards, whether to provide the jackpot in association with the single bet placed on the jackpot, responsive to the single bet being placed on the jackpot and the determined quantity of cards of the displayed plurality of cards comprising four or less displayed cards, determine, based on at least two of the displayed plurality of cards, whether to provide the jackpot in association with the single bet placed on the jackpot, and responsive to a cashout input being received, initiate a payout associated with the credit balance.

14. The betting terminal of claim 13, wherein responsive to the single bet being placed on the jackpot and the determined quantity of cards of the displayed plurality of cards comprising six or more displayed cards, the determination of whether to provide the jackpot in association with the single bet placed on the jackpot is based on six cards that are displayed last in the play of the live baccarat game forming a combination selected from the group consisting of: the last six cards forming a sequence; six cards of a kind; five cards of a kind; four cards of a kind; four cards of a kind plus a pair; three cards of a kind plus a pair; three cards of a kind; three pairs; and six cards of a same suit.

15. The betting terminal of claim 13, wherein responsive to the single bet being placed on the jackpot and the determined quantity of cards of the displayed plurality of cards comprising five displayed cards, the determination of whether to provide the jackpot in association with the single bet placed on the jackpot is based on five cards that are displayed last in the play of the live baccarat game forming a combination selected from the group consisting of: the last five cards forming a sequence; five cards of a kind; four cards of a kind; three cards of a kind plus a pair; three cards of a kind; two pairs; and five cards of the same suit.

16. The betting terminal of claim 13, wherein responsive to the single bet being placed on the jackpot and the determined quantity of cards of the displayed plurality of cards comprising four or less displayed cards, the determination of whether to provide the jackpot in association with the single bet placed on the jackpot is based on four cards that are displayed last displayed last in the play of the live baccarat game forming a combination selected from the group consisting of: the last four cards forming a sequence; the last four cards of a kind; three cards of a kind; two cards of a kind plus a pair; two cards of a kind; and four cards of the same suit.

17. The betting terminal of claim 13, wherein responsive to the single bet being placed on the jackpot and the determined quantity of cards of the displayed plurality of cards comprising four or less displayed cards, the determination of whether to provide the jackpot in association with the single bet placed on the jackpot is based on three cards that are displayed last displayed last in the play of the live baccarat game forming a combination selected from the group consisting of: the last three cards forming a sequence; the last three cards of a kind; two cards of a kind; two cards forming a pair; and three cards of the same suit.

18. The betting terminal of claim 13, wherein responsive to the single bet being placed on the jackpot and the determined quantity of cards of the displayed plurality of cards comprises four or less displayed cards, the determination of whether to provide the jackpot in association with the single bet placed on the jackpot is based on two cards that are displayed last displayed last in the play of the live baccarat game forming a combination selected from the group consisting of: the last two cards forming a sequence; two cards form a pair; and two cards of the same suit.

* * * * *